(12) United States Patent
Takeshima et al.

(10) Patent No.: US 11,716,000 B2
(45) Date of Patent: Aug. 1, 2023

(54) METHOD FOR MANUFACTURING ROTOR FOR ROTOR ELECTRIC MACHINE

(71) Applicant: TOYOTA JIDOSHA KABUSHIKI KAISHA, Toyota (JP)

(72) Inventors: Kenta Takeshima, Okazaki (JP); Shintaro Nakano, Toyota (JP); Ayumu Yageta, Toyota (JP); Shuzaburo Kita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/448,334

(22) Filed: Sep. 21, 2021

(65) Prior Publication Data

US 2022/0094247 A1    Mar. 24, 2022

(30) Foreign Application Priority Data

Sep. 23, 2020  (JP) .................................. 2020-159094
Feb. 1, 2021   (JP) .................................. 2021-014667

(51) Int. Cl.
  *H02K 15/03* (2006.01)
  *H02K 1/276* (2022.01)

(52) U.S. Cl.
  CPC ............. *H02K 15/03* (2013.01); *H02K 1/276* (2013.01); *Y10T 29/49012* (2015.01)

(58) Field of Classification Search
  CPC ........ H02K 1/276; H02K 15/03; H02K 37/04; H02K 5/161; Y10T 29/49012
  USPC ......... 29/598, 596, 604, 605, 606, 607, 609, 29/732
  See application file for complete search history.

(56) References Cited

U.S. PATENT DOCUMENTS

| 8,215,260 | B2 * | 7/2012 | Kimura | H02K 15/12 |
|           |      |        |        | 427/104 |
| 2004/0217666 | A1 * | 11/2004 | Mellor | H02K 1/276 |
|              |      |         |        | 310/156.53 |
| 2017/0302141 | A1 | 10/2017 | Yokota et al. | |

FOREIGN PATENT DOCUMENTS

| JP | 2001169485 A | 6/2001 |
| JP | 2010141989 A | 6/2010 |
| JP | 2014093917 A | 5/2014 |
| JP | 2020078147 A | 5/2020 |
| JP | 2020141552 A | 9/2020 |

* cited by examiner

*Primary Examiner* — Thiem D Phan
(74) *Attorney, Agent, or Firm* — Hunton Andrews Kurth LLP

(57) ABSTRACT

A method of manufacturing a rotor for a rotating electric machine. The rotor includes a rotor core and at least one magnet fixed in at least one magnet fixing portion provided in the rotor core. The method includes: (a) placing the at least one magnet and at least one fixing member in the at least one magnet fixing portion such that each of the at least one fixing member is positioned between a corresponding one of the at least one magnet fixing portion and a corresponding one of the at least one magnet; and (b) applying an electric current to the at least one magnet to heat the at least one fixing member by heat generated by an electrical resistance of the at least one magnet, and fixing the at least one magnet to the at least one magnet fixing portion through the heated at least one fixing member.

7 Claims, 13 Drawing Sheets

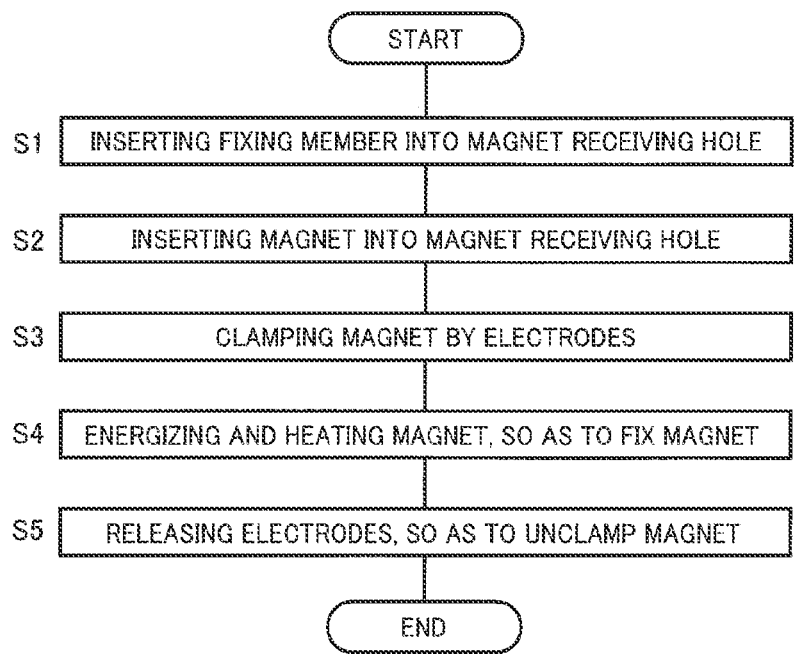

INSERTING FIXING MEMBER

INSERTING MAGNET

CLAMPING MAGNET

ENERGIZING AND HEATING MAGNET

FIXING MAGNET

UNCLAMPING MAGNET

ATTACHING FIXING MEMBER

INSERTING MAGNET

CLAMPING MAGNET

ENERGIZING AND HEATING MAGNET

FIXING MAGNET

UNCLAMPING MAGNET

METHOD FOR MANUFACTURING ROTOR FOR ROTOR ELECTRIC MACHINE

This application claims priority from Japanese Patent Applications No. 2020-159094 and No. 2021-014667 filed on Sep. 23, 2020 and Feb. 1, 2021, respectively, the disclosures of which are hereby incorporated by reference in their entireties.

FIELD OF THE INVENTION

The present invention relates to a method and a device for manufacturing a rotor that is to be provided in a rotating electric machine, and particularly relates to techniques for fixing a magnet to a rotor core of the rotor.

BACKGROUND OF THE INVENTION

There is known a method of manufacturing a rotor that is to be provided in a rotating electric machine, wherein the rotor includes (i) a rotor core and (ii) at least one magnet fixed in at least one magnet fixing portion which is provided in the rotor core and which extends in parallel to an axis of the rotor core. In the known method, each of at least one fixing member, which is placed between a corresponding one of the at least one magnet fixing portion and a corresponding one of the at least one magnet, is heated, whereby the corresponding magnet is fixed to the corresponding magnet fixing portion through the heated fixing member. A method disclosed in JP-6322924-B2 is an example of such a method. In the method disclosed in this Japanese Patent Publication, a foam sheet as the fixing member is fixed to the magnet that is placed in a magnet receiving hole as the magnet fixing portion, and the rotor core is heated whereby the foam sheet is expanded and the magnet is fixed in a predetermined position in the receiving hole.

SUMMARY OF THE INVENTION

However, in the above-described conventional method of manufacturing the rotor that is to be provided in the rotating electric machine, it is necessary to heat the fixing member and also the rotor core having a large thermal capacity, thereby requiring a large-sized heating furnace and also lots of time and energy for heating.

The present invention was made in view of the background art described above. It is therefore an object of the present invention to make it possible to heat the fixing member without using a heating furnace, and to reduce time and energy required to heat the fixing member.

The object indicated above is achieved according to the following aspects of the present invention.

According to a first aspect of the invention, there is provided a method of manufacturing a rotor that is to be provided in a rotating electric machine, the rotor including (i) a rotor core and (ii) at least one magnet fixed in at least one magnet fixing portion which is provided in the rotor core and which extends in parallel to an axis of the rotor core, the method comprising: (a) a placing step of placing the at least one magnet and at least one fixing member in the at least one magnet fixing portion of the rotor core such that each of the at least one fixing member is positioned between a corresponding one of the at least one magnet fixing portion and a corresponding one of the at least one magnet; and (b) a fixing step of applying an electric current to the at least one magnet through electrodes brought in contact with opposite end portions of the at least one magnet, so as to heat the at least one fixing member by heat generated by an electrical resistance of the at least one magnet, and fixing the at least one magnet to the at least one magnet fixing portion through the heated at least one fixing member. It is noted that the method according to the first aspect of the invention may be performed by using an apparatus defined in any one of eighth through fifteenth aspects of the invention that will be described later.

According to a second aspect of the invention, in the method according to the first aspect of the invention, each of the at least one magnet, which is to be fixed to a corresponding one of the at least one magnet fixing portion, includes a certain number of divided portions that are divided by at least one plane, which is parallel to the axis of the rotor core when the each of the at least one magnet is fixed to the corresponding one of the at least one magnet fixing portion, wherein each of the electrodes has a fork shape, and includes the certain number of branch portions, which are to be brought into contact with end portions of the respective divided portions of a corresponding one of the at least one magnet, independently of each other, and wherein the certain number is a natural number that is two or more than two.

According to a third aspect of the invention, in the method according to the first or second aspect of the invention, at the fixing step, a direct current as the electric current is applied to the at least one magnet.

According to a fourth aspect of the invention, in the method according to any one of the first through third aspects of the invention, at the fixing step, the electrodes are pressed against the at least one magnet by a predetermined constant pressing force.

According to a fifth aspect of the invention, in the method according to any one of the first through fourth aspects of the invention, the at least one magnet fixing portion provided in the rotor core consists of a plurality of magnet fixing portions, and the at least one magnet consists of a plurality of magnets that are to be fixed to the respective magnet fixing portions, wherein, at the fixing step, at least two of the plurality of magnets are electrically connected in series, and the electric current is applied to the at least two of the plurality of magnets concurrently each other.

According to a sixth aspect of the invention, in the method according to any one of the first through fifth aspects of the invention, the at least one fixing member includes a thermosetting resin, a thermoplastic resin and/or an expansion material, wherein, at the fixing step, the at least one magnet is fixed to the at least one magnet fixing portion, by curing of the thermosetting resin which is caused by heating of the thermosetting resin, cooling curing of the thermoplastic resin after softening of the thermoplastic resin which is caused by heating of the thermoplastic resin, or expansion of the expansion material which is caused by heating of the expansion material.

According to a seventh aspect of the invention, in the method according to any one of the first through sixth aspects of the invention, at the fixing step, a voltage of the electric current applied to the at least one magnet is controlled such that the at least one magnet is energized with a constant current value, and, at the fixing step, it is monitored whether the voltage or an output (corresponding to an electric power or a power), which is a product of the current value and the voltage, is a predetermined abnormality determination value or higher, and application of the electric current to the at least one magnet is suspended when the voltage or the output is not smaller than the predetermined abnormality determination value.

According to an eighth aspect of the invention, there is provided an apparatus for manufacturing a rotor that is to be provided in a rotating electric machine, the rotor including (i) a rotor core and (ii) at least one magnet fixed in at least one magnet fixing portion which is provided in the rotor core and which extends in parallel to an axis of the rotor core, the apparatus comprising: (a) a holding device configured to hold the rotor core; (b) a pressing device configured to press electrodes against opposite end portions of the at least one magnet that is placed together with at least one fixing member in the at least one magnet fixing portion provided in the rotor core held by the holding device; and (c) an energization control device configured to apply an electric current to the at least one magnet through the electrodes, so as to heat the at least one fixing member by heat generated by an electrical resistance of the at least one magnet, and to fix the at least one magnet to the at least one magnet fixing portion through the heated at least one fixing member.

According to a ninth aspect of the invention, in the apparatus according to the eighth aspect of the invention, each of the at least one magnet, which is to be fixed to a corresponding one of the at least one magnet fixing portion, includes a certain number of divided portions that are divided by at least one plane, which is parallel to the axis of the rotor core when the each of the at least one magnet is fixed to the corresponding one of the at least one magnet fixing portion, wherein each of the electrodes has a fork shape, and includes the certain number of branch portions, which are to be brought into contact with end portions of the respective divided portions of a corresponding one of the at least one magnet, independently of each other, and wherein the certain number is a natural number that is two or more than two.

According to a tenth aspect of the invention, in the apparatus according to the eighth or ninth aspect of the invention, the energization control device is configured to apply a direct current as the electric current to the at least one magnet.

According to an eleventh aspect of the invention, in the apparatus according to any one of the eighth through tenth aspects of the invention, the pressing device is configured to press the electrodes against the at least one magnet by a predetermined constant pressing force.

According to a twelfth aspect of the invention, in the apparatus according to any one of the eighth through eleventh aspects of the invention, the at least one magnet fixing portion consists of a plurality of magnet fixing portions that are provided around the axis of the rotor core, and the least one magnet consists of a plurality of magnets that are fixed in the respective magnet fixing portions, wherein the apparatus comprises a rotating device configured to rotate the holding device that holds the rotor core, about the axis of the rotor core, wherein the pressing device is disposed in a magnet fixing position, which is a predetermined position about the axis of the rotor core when the rotor core is held by the holding device, and wherein the pressing device is configured to bring the electrodes close to at least one of the plurality of magnets which is placed in a corresponding at least one of the plurality of magnet fixing portions and press the electrodes against the at least one of the plurality of magnets when the corresponding at least one of the plurality of magnet fixing portions is positioned in the magnet fixing position.

According to a thirteenth aspect of the invention, in the apparatus according to the twelfth aspect of the invention, the electrodes include, in addition to a pair of electrodes to which a voltage of the electric current is to be applied, a connecting electrode that is to be pressed against end portions of at least two of the plurality of magnets which are placed in corresponding at least two of the plurality of magnet fixing portions when the corresponding at least two of the plurality of magnet fixing portions are positioned in the magnet fixing position, wherein the at least two of the plurality of magnets are electrically connected in series, and the electric current is applied to the at least two of the plurality of magnets concurrently each other, when the connecting electrode and the pair of electrodes are pressed against the end portions of the at least two of the plurality of magnets.

According to a fourteenth aspect of the invention, in the apparatus according to any one of the eighth through thirteenth aspects of the invention, the at least one fixing member includes a thermosetting resin, a thermoplastic resin or an expansion material, wherein, when the electric current is applied to the at least one magnet by the energization control device, the at least one magnet is fixed to the at least one magnet fixing portion, by curing of the thermosetting resin which is caused by heating of the thermosetting resin, cooling curing of the thermoplastic resin after softening of the thermoplastic resin which is caused by heating of the thermoplastic resin, or expansion of the expansion material which is caused by heating of the expansion material.

According to a fifteenth aspect of the invention, in the apparatus according to any one of the eighth through fourteenth aspects of the invention, the energization control device is configured to control a voltage of the electric current applied to the at least one magnet such that the at least one magnet is energized with a constant current value, wherein the energization control device is configured to monitor whether the voltage or an output (corresponding to an electric power or a power), which is a product of the current value and the voltage, is a predetermined abnormality determination value or higher, and to suspend application of the electric current to the at least one magnet when the voltage or the output is not smaller than the predetermined abnormality determination value.

In the method of manufacturing the rotor that is to be provided in the rotating electric machine, according the first aspect of the invention, the at least one magnet and at least one fixing member are placed in the at least one magnet fixing portion of the rotor core such that each of the at least one fixing member is positioned between a corresponding one of the at least one magnet fixing portion and a corresponding one of the at least one magnet; and then the electric current is applied to the at least one magnet through the electrodes brought in contact with the opposite end portions of the at least one magnet, so as to heat the at least one fixing member by the heat generated by the electrical resistance of the at least one magnet, so that the at least one magnet is fixed to the at least one magnet fixing portion through the heated at least one fixing member. Therefore, a heating furnace is not needed, and it is possible to reduce time and energy required for heating. Further, the heat temperature of the fixing member is dependent on the heat generation amount of the magnet, wherein the heat generation amount can be easily adjusted depending on an electric current value (i.e., current value of the electric current applied to the at least one magnet) and an energizing time (i.e., length of time for which the at least one magnet is energized by the electric current applied to the at least one magnet), so that it is possible to appropriately prevent a fixing failure that could be caused if the heat temperature is too low and a deterioration of the rotor core and/or the magnet that could be caused if the heat temperature is too high.

In the method according to the second aspect of the invention, each of the at least one magnet, which is to be fixed to the corresponding one of the at least one magnet fixing portion, includes the certain number of the divided portions. When the rotating electric machine including the rotor provided with the at least one magnet each constituted by the certain number of the divided portions is actually used, an eddy current loss in the at least one magnet is reduced owing to the divisions of each the at least one magnet, and the more the eddy current loss is reduced the more the number of the divisions of each the at least one magnet is, so that the efficiency of the rotating electric machine is increased. In a case in which the magnet (that is constituted by the divided portions) is placed in a position offset from a centerline of the magnet fixing portion, the divided portions are in contact at their contact surfaces with each of the electrodes wherein the contact surfaces of the respective divided portions are different in area from each other, so that the electrical resistance in the contact portion of one of the divided portions and the electrical resistance in the contact portion of another one of the divided portions are different from each other whereby the heat generation amounts in the respective divided portions are made different from each other. Due to the difference or variation of the heat generation amount, the heat temperature of the fixing member could vary portion to portion, so that the fixing failure could be caused in a portion of the lower heat temperature while the magnet could be deteriorated in a portion of the higher heat temperature. However, in the method according to the second aspect of the invention, each of the electrodes has a fork shape, and includes the certain number of the branch portions, which are to be brought into contact with the end portions of the respective divided portions of the magnet, independently of each other, so that the contact surfaces of the respective divided portions with each of the electrodes are substantially the same in area as each other, irrespective of positional offset (positional deviation) of the magnet from the centerline of the magnet fixing portion. Therefore, it is possible to increase the temperature substantially evenly in the certain number of the divided portions and to heat substantially evenly the entirety of the fixing member whereby the certain number of the divided portions can be appropriately fixed to the rotor core. That is, a robustness against the positional offset or deviation can be improved, and reduction of the magnet performance and insufficiency of the fixing strength, which could be caused due to variation of the heat generation amount, can be suppressed.

In the method according to the third aspect of the invention, the direct current as the electric current is applied to the at least one magnet so as to heat the at least one magnet, so that it is possible to more appropriately heat only the at least one magnet and heat the at least one fixing member, as compared with an arrangement in which an alternating current is applied to the at least one magnet. In the arrangement in which the at least one magnet is heated by applying the alternating current to the at least one magnet, an induced current is generated around the magnet due to an electromagnetic induction. Therefore, in a case in which a narrow portion having a small width is present, for example, between each adjacent two of a plurality of magnet receiving holes as the at least one magnet fixing portion, a current density could become so high in the narrow portion whereby the narrow portion could be excessively heated so that there is a risk that the narrow portion could be burned out, for example. However, in the method according to the second aspect of the invention in which the direct current as the electric current is applied to the at least one magnet, the excessive heating of the rotor core can be suppressed.

In the method according to the fourth aspect of the invention, the electrodes are pressed against the at least one magnet by the predetermined constant pressing force. Therefore, irrespective of possible variation of a dimension of the at least one magnet, the electrical resistance in the contact portions of the at least one magnet held in contact with the electrodes is held substantially constant whereby the electric current value (effective value in case of the alternating current) flowing in the at least one magnet and the heat generation amount are held substantially constant so that the at least one fixing member can be appropriately heated.

In the method according to the fifth aspect of the invention, the at least one magnet fixing portion provided in the rotor core consists of the plurality of magnet fixing portions, and the at least one magnet consists of the plurality of magnets that are to be fixed to the respective magnet fixing portions, and at least two of the plurality of magnets are electrically connected in series, and the electric current is applied to the at least two of the plurality of magnets concurrently each other. Thus, since the at least two magnets can be fixed to the respective magnet fixing portions concurrently with each other, the magnets can be fixed to the respective magnet fixing portions with an improved efficiency. Further, since the at least two magnets are electrically connected in series, the current value of the electric current flowing in the at least two magnets is constant whereby the heat generation amounts in the at least two magnets are substantially the same as each other, so that it is possible to suppress variation of the fixing strength in the at least two magnets established by the heating of corresponding at least two of a plurality of fixing members as the at least one fixing member.

In the method according to the sixth aspect of the invention, the at least one fixing member includes the thermosetting resin, the thermoplastic resin or the expansion material, and the at least one magnet is fixed to the at least one magnet fixing portion, by the curing of the thermosetting resin which is caused by the heating of the thermosetting resin, the cooling curing of the thermoplastic resin after the softening of the thermoplastic resin which is caused by the heating of the thermoplastic resin, or the expansion of the expansion material which is caused by the heating of the expansion material, so that the at least one magnet can be appropriately fixed to the rotor core.

In the method according to the seventh aspect of the invention, the voltage of the electric current applied to the at least one magnet is controlled such that the at least one magnet is energized with the constant current value. Therefore, since the heat generation amount in the energized and heated at least one magnet is held substantially constant, the at least one magnet can be appropriately fixed to the rotor core, by the heating of the at least one magnet. Further, if failure of contact between the electrodes and the at least one magnet is caused by, for example, entrance of foreign objects therebetween, wears of the electrodes or inclination of the at least one magnet, the at least one magnet could be thermally cracked or the at least one fixing member could be thermally deteriorated, due to a thermal expansion variation caused by a locally abnormal heating, so that the fixing strength of the at least one magnet could be reduced as a result of the thermal cracking or deterioration. The locally abnormal heating caused by the contact failure is hard to be confirmed from outside. However, since the voltage is extremely increased if the electrical resistance is increased due to the contact failure between the electrodes and the at least one magnet, the contact failure can be detected based on the voltage or the output (that is the product of the current value and the voltage). That is, it is monitored whether the voltage or the output is the predetermined abnormality determination value or higher, and the application of the electric current to the at least one magnet is suspended when the voltage or the output is not smaller than the predetermined abnormality determination value, so that it is possible to prevent the thermal crack of the at least one magnet and the deterioration of the at least one fixing member, which could be caused by the locally abnormal heating due to the contact failure between the electrodes and the at least one magnet.

In the apparatus for manufacturing the rotor that is to be provided in the rotating electric machine, according to the eighth aspect of the invention, there are provided (a) the holding device configured to hold the rotor core, (b) the pressing device configured to press electrodes against opposite end portions of the at least one magnet that is placed together with the at least one fixing member in the at least one magnet fixing portion provided in the rotor core held by the holding device, and (c) the energization control device configured to apply the electric current to the at least one magnet through the electrodes, so as to heat the at least one fixing member by the heat (joule heat) generated by the electrical resistance of the at least one magnet, and to fix the at least one magnet to the at least one magnet fixing portion through the heated at least one fixing member. In the apparatus according to this eighth aspect of the invention, substantially the same effects as in the method according to the above-described first aspect of the invention can be obtained.

In the apparatus according to the ninth aspect of the invention, each of the at least one magnet, which is to be fixed to a corresponding one of the at least one magnet fixing portion, includes the certain number of the divided portions, and each of the electrodes has the fork shape, and includes the certain number of the branch portions, which are to be brought into contact with the end portions of the respective divided portions of the corresponding one of the at least one magnet, independently of each other. In the apparatus according to this ninth aspect of the invention, substantially the same effects as in the method according to the above-described second aspect of the invention can be obtained.

In the apparatus according to the tenth aspect of the invention, the energization control device is configured to apply the direct current as the electric current to the at least one magnet. In the apparatus according to this tenth aspect of the invention, substantially the same effects as in the method according to the above-described third aspect of the invention can be obtained.

In the apparatus according to the eleventh aspect of the invention, the pressing device is configured to press the electrodes against the at least one magnet by the predetermined constant pressing force. In the apparatus according to this eleventh aspect of the invention, substantially the same effects as in the method according to the above-described fourth aspect of the invention can be obtained.

In the apparatus according to the twelfth aspect of the invention, the at least one magnet fixing portion consists of the plurality of magnet fixing portions that are provided around the axis of the rotor core, and the least one magnet consists of the plurality of magnets that are fixed in the respective magnet fixing portions, wherein the apparatus includes the rotating device configured to rotate the holding device that holds the rotor core, about the axis of the rotor core, wherein the pressing device is disposed in the magnet fixing position, which is the predetermined position about the axis of the rotor core when the rotor core is held by the holding device, and wherein the pressing device is configured to bring the electrodes close to the at least one of the plurality of magnets which is placed in the corresponding at least one of the plurality of magnet fixing portions and press the electrodes against the at least one of the plurality of magnets when the corresponding at least one of the plurality of magnet fixing portions is positioned in the magnet fixing position. Therefore, with the rotor core being rotated about the axis by the rotating device, the plurality of magnets can be sequentially fixed into the respective magnet fixing portions. That is, the apparatus can be constructed more easily and made more compact in size at a lower cost, as compared with in an arrangement in which the plurality of magnets and the plurality of fixing members are placed in the respective magnet fixing portions of the rotor core and then the electrodes are pressed against the plurality of magnets so as to be energized concurrently with each other.

In the apparatus according to the thirteenth aspect of the invention, the electrodes include, in addition to a pair of electrodes to which a voltage of the electric current is to be applied, a connecting electrode that is to be pressed against end portions of at least two of the plurality of magnets which are placed in corresponding at least two of the plurality of magnet fixing portions when the corresponding at least two of the plurality of magnet fixing portions are positioned in the magnet fixing position, wherein the at least two of the plurality of magnets are electrically connected in series, and the electric current is applied to the at least two of the plurality of magnets concurrently each other, when the connecting electrode and the pair of electrodes are pressed against the end portions of the at least two of the plurality of magnets. Therefore, since the at least two magnets can be fixed to the corresponding at least two magnet fixing portions concurrently with each other, the magnets can be fixed to the respective magnet fixing portions with an improved efficiency. Further, since the at least two magnets are electrically connected in series, the current value of the electric current flowing in the at least two magnets is constant whereby the heat generation amounts in the at least two magnets are substantially the same as each other, so that it is possible to suppress variation of the fixing strength in the at least two magnets established by the heating of corresponding at least two of a plurality of fixing members as the at least one fixing member.

In the apparatus according to the fourteenth aspect of the invention, the at least one fixing member includes the thermosetting resin, the thermoplastic resin or the expansion material. In the apparatus according to this fourteenth aspect of the invention, substantially the same effects as in the method according to the above-described sixth aspect of the invention can be obtained.

In the apparatus according to the fifteenth aspect of the invention, the voltage of the electric current applied to the at least one magnet is controlled such that the at least one magnet is energized with the constant current value. Further, when the voltage or the output is not smaller than the predetermined abnormality determination value, it is determined that an abnormality occurs, and the application of the electric current to the at least one magnet is suspended, so that it is possible to prevent the thermal crack of the at least one magnet and the deterioration of the at least one fixing member, which could be caused by the locally abnormal heating due to the contact failure between the electrodes and the at least one magnet. In the apparatus according to this fifteenth aspect of the invention, substantially the same effects as in the method according to the above-described seventh aspect of the invention can be obtained.

BRIEF DESCRIPTION OF THE DRAWINGS

FIG. 6 is a flow chart for explaining an example of a manufacturing process of manufacturing the rotor by using the manufacturing apparatus of FIG. 5;

DETAILED DESCRIPTION OF PREFERRED EMBODIMENTS

Figure 1:
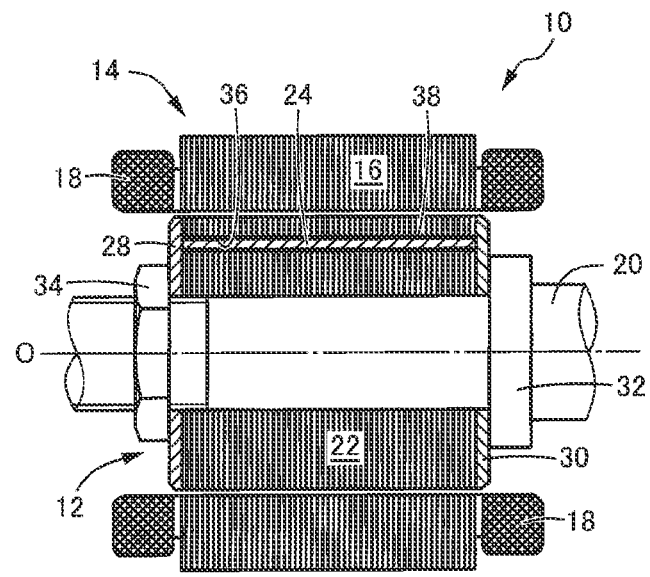
FIG. 1 is a cross sectional view, viewed along arrows I-I in FIG. 2, for explaining a rotating electric machine including a rotor that has been manufactured in accordance with a method according to the present invention.

The rotating electric machine is referred also to as a rotating machine, and may be an electric machine, a generator, or a motor generator that can be used selectively as the electric machine or the generator. The rotating electric machine is, for example, a permanent-magnet synchronous motor. The rotor may be either an inner rotor that is disposed on an inner peripheral side, or an outer rotor that is disposed on an outer peripheral side. Although being constituted preferably by a rare-earth element magnet, each of the at least one magnet may be constituted by any of other permanent magnets that can be heated when being energized. The at least one magnet may be of embedded type such that the at least one magnet consists of a multiplicity of magnets that are inserted together with a multiplicity of fixing members as the at least one fixing member, into a multiplicity of magnet receiving holes as the at least one magnet fixing portion provided in the rotor core, or may be of surface type such that the at least one magnet consists of a multiplicity of magnets that are fixed to a multiplicity of magnet fixing portions as the at least one magnet fixing portion provided in an outer circumferential surface or an inner circumferential surface of the rotor core through a multiplicity of fixing members as the at least one fixing member. Where the at least one magnet is of the surface type, the at least one magnet may consist of a plurality of magnets in the form of segmented magnets, or may consist of a single magnet in the form of a ring-shaped magnet. Each of the at least one magnet may be covered, as needed, with an insulation film such as a synthetic resin film and an oxide film. Further, the at least one magnet may consist of a plurality of various kinds of magnets that are different from each other in terms of, for example, polarity, magnetic flux, holding power and cross sectional shape.

The at least one fixing member, through which the at least one magnet is to be fixed to the rotor core, is constituted to include, for example, the thermosetting resin, the thermoplastic resin and/or the expansion material. The at least one magnet is fixed to the rotor core, for example, with curing of the thermosetting resin filling a clearance between each of the at least one magnet and a corresponding one of the at least one magnet fixing portion. That is, the thermosetting resin serves as an adhesive. Further, with the expansion material being heated and caused to expand, the clearance between each of the at least one magnet and a corresponding one of the at least one magnet fixing portion is filled with the expansion material caused to expand, and the each of the at least one magnet is fixed to the rotor core by a pressing force generated by the expansion of the expansion material. The at least one fixing member may be constituted also by a combination of the thermosetting resin, thermoplastic resin and expansion material. The expansion material is, for example, a foamable resin or a porous member that are caused to expand when being heated. The porous member is, for example, a fiber member such as a glass fiber and a metal fiber, and is used as a composite material in which the porous member is mixed with a binder such as a synthetic resin. With the porous member being compressed, the porous member is formed to have a thin-plate shape owing to effect of the binder, while being placed together with a corresponding one of the at least one magnet in a corresponding one of the magnet fixing portion. When the binder is softened by the heating, the fiber member is caused to expand by a residual stress so as to become porous, and the corresponding one of the at least one magnet is fixed to the rotor core owing to an adhesive force of the thermosetting resin and a pressing force generated as a result of the expansion of the fiber member. Since the fiber member becomes porous by its expansion, it is possible to cool the rotor by causing a cooling fluid such as a lubricant oil to be distributed through pores when the rotating electric machine is actually used. It is noted that the at least one fixing member does not necessary have to be constituted to include the thermosetting resin, the thermoplastic resin and/or the expansion material, but may be constituted by other material.

At the placing step that is implemented to place the at least one magnet and the at least one fixing member in the at least one magnet fixing portion, the at least one magnet may be placed after the at least one fixing member has been in placed in the at least one magnet fixing portion, or alternatively, the at least one fixing member may be placed after the at least one magnet has been placed in the at least one magnet fixing portion. Further, the at least one magnet and the at least one fixing member may be placed in the at least one magnet fixing portion, after the at least one fixing member has been attached to the at least one magnet, for example, by winding each of the at least one fixing member having a thin-plate shape, onto an outer circumferential surface of a corresponding one of the at least one magnet, adhering the each of the at least one the fixing member onto a part of the outer circumferential surface of the corresponding one of the at least one magnet, or fitting the corresponding one of the at least one magnet into an inside of the each of the at least one the fixing member having a thin-plate tubular shape. Each of the at least one fixing member may be a solid body having a constant shape or deformable shape, or may be a fluid body by which the clearance between a corresponding one of the at least one magnet and a corresponding one of the at least one magnet fixing portion. It is noted that at least one step (such as this placing step) of the method of manufacturing the rotor for the rotating electric machine can be implemented also by a manual operation of an operator.

Each of the at least one magnet, which is to be fixed to a corresponding one of the at least one magnet fixing portion, is preferably constituted by a plurality of divided portions, so as to reduce an eddy current loss in each of the at least one magnet. However, each of the at least one magnet may be constituted by a single member without the division. Further, where each of the at least one magnet is constituted by a certain number n of the divided portions, it is preferable that each of the electrodes is constituted by a pectinate or fork-shape electrode including the certain number n of protruding branch portions, i.e., the certain number n of tooth portions. However, each of the electrodes may have a sing contact surface that is to be brought into contact with the end portions of the respective divided portions.

The pressing device, which is configured to press the electrodes against the end portions of the at least one magnet, is preferably subjected to a constant pressing-force control by which the electrodes are to be pressed against the at least one magnet by the predetermined constant pressing force. However, where a dimensional error of the at least one magnet is small, for example, each of the electrodes may be moved to a constant pressing position so as to be pressed against the at least one magnet. The constant pressing-force control is executed, for example, by controlling a stop position (approach position) of each of the electrodes by detecting the pressing force through a load sensor or like. Where each of the electrodes is moved toward the at least one magnet by using a motor, the pressing force can be controlled by controlling a motor torque. Where each of the electrodes is moved toward the at least one magnet by a fluid pressure cylinder such as an air cylinder, the pressing force can be controlled by controlling a fluid pressure. That is, the pressing force can be controlled in any one of various manners. The energization control device is configured to control the heat generation amount of the at least one magnet, i.e., the electric current value and the energizing time of the electric current, such that the at least one fixing member is heated by heating of the at least one magnet whereby the at least one magnet is fixed to the rotor core. Although the electric current applied to the at least one magnet is preferably the direct current, the alternating current may be applied to the at least one magnet. Each of the electrodes, which are to be pressed against the at least one magnet, has a temperature that is increased by heat generated by itself and/or heat transmitted from the at least one magnet when transmitting the electric current to the at least one magnet, so that it is preferable that a coolant circulation unit is provided to cool the electrodes, as needed, by the cooling fluid.

Where the at least one magnet fixing portion consists of a plurality of magnet fixing portions that are provided about the axis of the rotor core, and a plurality of magnets as the at least one magnet are to be fixed to the respective magnet fixing portions, the electrodes may be pressed against at least one of the plurality of magnets for energizing the at least one of the plurality of magnets when the at least one of the plurality of magnets are positioned in the predetermined magnet fixing position, while the rotor core is rotated about the axis by the rotating device, for example. However, all of the plurality of magnets can be energized concurrently with each other, by using the electrodes whose number is the same as the number of the plurality of magnet fixing portions provided in the rotor core, and pressing the electrodes against all of the plurality of magnets concurrently with each other. Further, a plurality of pressing devices may be disposed in respective positions about the axis of the rotor core, so as to press the electrodes against the plurality of electrodes that are positioned in a plurality of magnet fixing position, so as to energize the plurality of electrodes. That is, the energization of the plurality of magnets can be made in any one of various manners. Still further, at least two of the plurality of magnets placed in the respective magnet fixing portions may be electrically connected in series or in parallel, so as to be energized concurrently with each other to be heated.

PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

Figure 2:
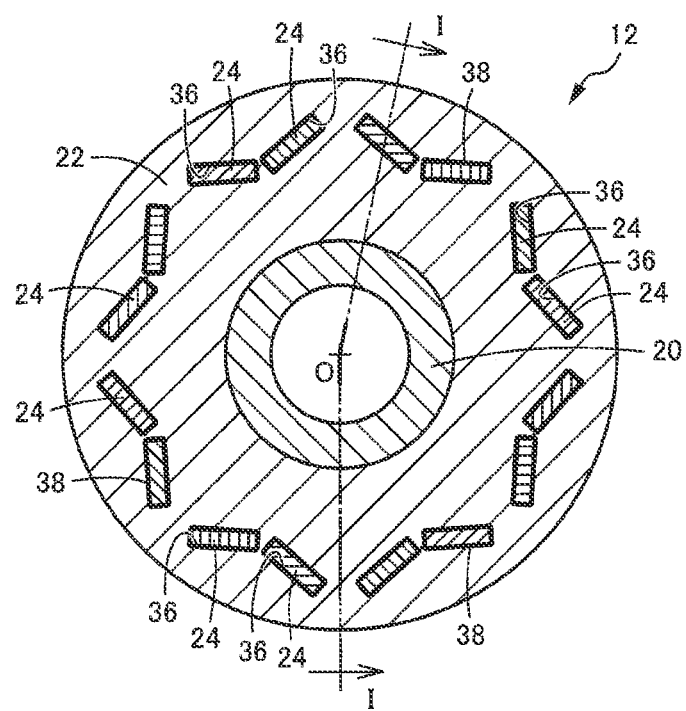
FIG. 2 is a cross sectional view showing, in a larger scale than in FIG. 1, the rotating electric machine of FIG. 1, taken in a plane perpendicular to an axis O of the rotor.

FIG. 1 is a cross sectional view, viewed along arrows I-I in FIG. 2, for explaining a rotating electric machine 10 including a rotor 12 that has been manufactured in accordance with a method according to the present invention. FIG. 2 is a cross sectional view showing, in a larger scale than in FIG. 1, the rotating electric machine 10 of FIG. 1, taken in a plane perpendicular to an axis O of the rotating electric machine 10. The rotating electric machine 10 is a permanent-magnet embedded type synchronous motor serving as a motor generator that can be used selectively as an electric motor or a generator. The rotating electric machine 10 is advantageously used as a drive power source of a battery electric vehicle such as a hybrid electric vehicle, for example. The rotating electric machine 10 includes the above-described rotor 12 and a stator 14 that are coaxial with the axis O. In the following description of the present embodiment, the axis O of the rotating electric machine 10 is also used to refer to an axis of the rotor 12. The stator 14 includes a cylindrical tubular-shaped stator core 16 disposed on a radially outer side of the rotor 12, and a plurality of stator coils 18 wound on the stator core 16. The stator core 16 is constituted by a multiplicity of annular-shaped steel plates that are laminated in an axial direction, i.e., a direction parallel to the axis O, with each of the steel plates being in an attitude perpendicular to the axis O, and is fixed in a casing (not shown) through fixing means such as press-fitting and screw bolts.

The rotor 12 includes a rotor shaft 20, a cylindrical tubular-shaped rotor core 22 attached onto an outer circumferential surface of the rotor shaft 20, and a multiplicity of magnets 24 embedded in the rotor core 22. The rotor core 22 is constituted by a multiplicity of annular-shaped steel plates that are laminated in the axial direction, i.e., the direction parallel to the axis O, with each of the steel plates being in an attitude perpendicular to the axis O. A pair of end plates 28, 30 are provided on axially opposite sides of the rotor core 22, and are fixed to the rotor shaft 22. The rotor shaft 20 is provided with a flange portion 32, so that the rotor core 22 is sandwiched or clamped between the flange portion 32 and a nut 34 that is in thread engagement with the rotor shaft 20, whereby the rotor core 22 is fixed onto the rotor shaft 20. The rotor core 22 has a multiplicity of magnet receiving holes 36 that pass through in the axial direction, and the magnets 24 are fixedly received in the respective magnet receiving holes 36. The multiplicity of magnet receiving holes 36 consist of a plurality of pairs of holes 36 (eight pairs of holes 36 in the present embodiment) that are arranged at a constant angular interval in a circumferential direction around the axis O. Each pair of the holes 36 are adjacent to each other in the circumferential direction, and cooperate with each other to form a shallow V shape that is convexed toward the axis O, as shown in FIG. 2. In each pair of the holes 36, the magnets 24 are fixedly inserted to have respective attitudes by which the fixedly inserted magnets 24 are opposite to each other in terms of polarity of N and S poles. Each of the magnet receiving holes 36 corresponds to each of "at least one magnet fixing portion" recited in the appended claims, and has a rectangle shape in its cross section. It is noted that magnetization of each of the magnets 24 can be made also after the magnet 24 has been fixed to the rotor core 22.

Figure 3:
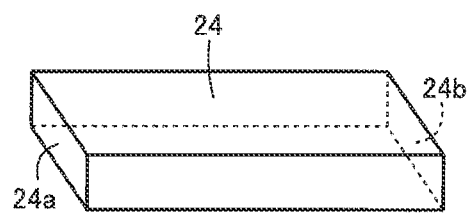
FIG. 3 is a perspective view for explaining an example of a magnet used in the rotor of FIG. 2.

Each of the magnets 24 has a length that is substantially the same as an axial length of the rotor core 22, and has a rectangle shape in its cross section that is perpendicular to its longitudinal direction, i.e., perpendicular to the axis O, as each of the magnet receiving holes 36. Each magnet 24 has a quadrangular prism shape as a whole. As is apparent from FIG. 3 that is a perspective view of each magnet 24, each magnet 24 has a rectangular plate shape that is elongated in the axial direction. Each magnet 24 is constituted preferably by a rare-earth element magnet, for example, and is covered with an insulation film, as needed, since performance of the rotating electric machine 10 could be damaged if the magnet 24 is brought into direct contact with the rotor core 22.

Figure 4:
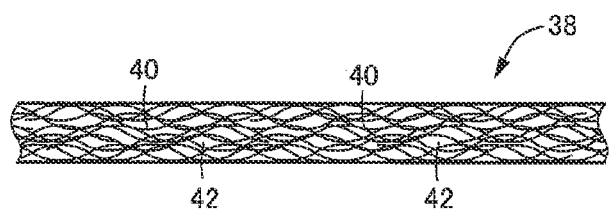
FIG. 4 is a cross sectional view for explaining an example of a fixing member through which the magnet is to be fixed to a rotor core.

There is a clearance between the magnet receiving hole 36 and the magnet 24 that is received in the magnet receiving hole 36, and the clearance is filled with a fixing member 38 whereby the magnet 24 is fixed inside the magnet receiving hole 36 through the fixing member 38. The fixing member 38 is placed between the magnet receiving hole 36 and the magnet 24, more specifically, between an inner circumferential surface of the magnet receiving hole 36 and an outer circumferential surface of the magnet 24, and is to be heated whereby the magnet 24 is fixed in the magnet receiving hole 36 through the fixing member 38. The fixing member 38 includes a thermosetting resin or a thermoplastic resin that serve as adhesives, or an expansion material, so that the magnet 24 is fixed to the magnet receiving hole 36 of the rotor core 22, by curing of the thermosetting resin which is caused by heating of the thermosetting resin, cooling curing of the thermoplastic resin after softening of the thermoplastic resin which is caused by heating of the thermoplastic resin, or expansion of the expansion material which is caused by heating of the expansion material. FIG. 4 shows an example of the fixing member 38, which is a composite material constituted by a mixture of a fiber member 40 as the expansion material and a binder 42. The fiber member 40 is, for example, a glass fiber or a metal fiber, and has a porous structure in which the fiber is intertwined like a nonwoven fabric. With the fiber member 40 being compressed, the fiber member 40 is formed to have a thin-plate shape owing to effect of the binder 42 such as synthetic resin, while being placed together with the magnet 24 in the magnet receiving hole 36. When the binder 42 is softened by the heating of the fixing member 38, the fiber member 40 is caused to expand by a residual stress so as to become porous, and the magnet 24 is fixed to the magnet receiving hole 36 of the rotor core 22 owing to a pressing force generated as a result of the expansion of the fiber member 40. Since the fiber member 40 becomes porous by its expansion, it is possible to cool the rotor 12 by causing a cooling fluid such as a lubricant oil to be distributed through pores when the rotating electric machine 10 is actually used. The fiber member 40 corresponds to a porous member. The binder 42 is constituted by, for example, polyethylene, polypropylene, polyvinyl chloride or other synthetic resin having a melting point lower than that of the fiber member 40. The fixing member 38 has a thin-plate shape before the heating and is caused to expand to be porous after the heating, namely, the fixing member 38 is changed in shape and structure before and after the heating. The fixing member 38 having the thin-plate shape before the heating is referred to as "fixing member (material)

38" in the following description. FIG. 4 shows the fixing member (material) 38 having the thin-plate shape before the heating.

Figure 5:
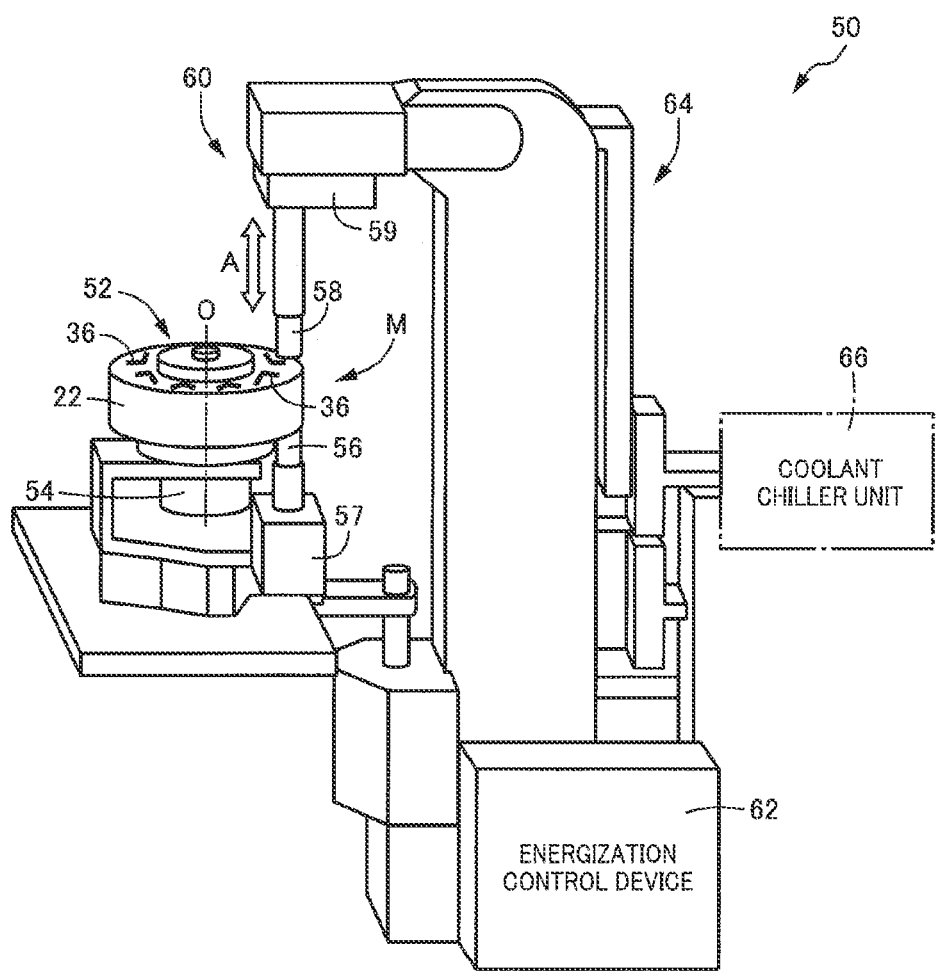
FIG. 5 is a schematic perspective view for explaining an example of a manufacturing apparatus that is to be used when the rotor is manufactured.

FIG. 5 is a schematic perspective view for explaining an example of a manufacturing apparatus 50 that is to be advantageously used when the rotor 12 of the rotating electric machine 10 is manufactured. This manufacturing apparatus 50 is a magnet fixing apparatus for fixing each of the magnets 24 into a corresponding one of the magnet receiving holes 36 of the rotor core 22. The manufacturing apparatus 50 includes: a holding device 52 configure to hold the rotor core 22; a rotating device 54 configured to rotate the holding device 52 holding the rotor core 22, about the axis O of the rotor core 22; a pressing device 60 configured to press electrodes 56, 58 against opposite ends of each of the magnets 24 which is placed together with a corresponding one of the fixing members (materials) 38 in a corresponding one of the magnet receiving holes 36 of the rotor core 22 held by the holding device 52; an energization control device 62 configured to apply an electric direct current to each of the magnets 24 through the electrodes 56, 58, so as to heat a corresponding one of fixing members 38 by heat (joule heat) generated by an electrical resistance of each magnet 24, and to fix each magnet 24 to the rotor core 22 by expansion or curing of the fixing member (material) 38 which is caused by heating of the fixing member (material) 38; and a coolant circulation unit 64 configured to cool the electrodes 56, 58.

In the present embodiment, the manufacturing apparatus 50 is of vertical type in which the rotor core 22 is held by the holding device 52 with the axis O of the rotor core 22 extending substantially in a vertical direction, and each of the magnets 24 is placed in a corresponding one of the magnet receiving holes 36. However, the manufacturing apparatus 50 may be of horizontal type in which the rotor core 22 is held by the holding device 52 with the axis O of the rotor core 22 extending substantially in a horizontal direction, and each of the magnets 24 is placed in a corresponding one of the magnet receiving holes 36. The holding device 52 includes a positioning shaft, which is, in place of the rotor shaft 20, to be inserted in a through-hole of the rotor core 22, whereby the multiplicity of steel plates are positioned in respective positions that are coaxial with one another. The rotating device 54 includes a motor and a speed reducer, and is configured to intermittently rotate the rotor core 22 together with the holding device 52 about the axis O such that the magnet receiving holes 36 provided in the rotor core 22 are sequentially stopped in a magnet fixing position M that is located on a right side of the axis O as seen in FIG. 5.

The pressing device 60 includes a lower-side moving device 57 and an upper-side moving device 59 which are disposed in the magnet fixing position M and which are configured to vertically move the lower electrode 56 and the upper electrode 58, respectively, so as to press the electrodes 56, 58 against longitudinally opposite ends of each of the magnets 24, which are opposite to each other in the axial direction, i.e., in the vertical direction parallel to the axis O, when each of the magnets 24 is positioned in the magnet fixing position M. The lower electrode 56 is to be vertically moved by the lower-side moving device 57 operated by a motor or the like, between a lower position as a withdrawn position and an upper position as a supporting position. When being positioned in the upper position, i.e., the supporting position, the lower electrode 56 supports the magnet 24 that has been inserted into the magnet receiving hole 36 from an upper side by an operation of a loader device (not shown) or a manual operation made by an operator. The upper electrode 58 is to be vertically moved by the upper-side moving device 59 operated by a motor or the like, between an upper position as a withdrawn position and a lower position as a pressing position, as indicated by arrow A in FIG. 5. When being positioned in the lower position, i.e., the pressing position, the upper electrode 58 is brought into contact with the upper end portion of the magnet 24 so as to cooperate with the lower electrode 56 to press the magnet 24. In this instance, a pressing force, which is applied to the magnet 24, is subjected to a constant pressing-force control that is executed to control the pressing force, based on a pressing load detected by, for example, a load sensor, for thereby the pressing force applied to the magnet 24 is substantially constant irrespective of possible variation of a dimension of the magnet 24. It is noted that the constant pressing-force control can be executed also by controlling torque of the motor of the upper-side moving device 59 by which the upper electrode 58 is to be vertically moved.

When the direct current is applied to the magnet 24 through the electrodes 56, 58 by the energization control device 62 in a state in which the magnet 24 is clamped between the electrodes 56, 58 by the pressing force that is a predetermined constant force, the fixing member (material) 38 is heated by heat (joule heat) generated by the electrical resistance of the magnet 24, and the magnet 24 is fixed to the rotor core 22 owing to expansion or curing of the fixing member (material) 38 which is caused by the heating of the fixing member (material) 38. A heat generation amount Q, which is an amount of the joule heat, is represented by expression (1) (given below) using an electric resistance value R, an electric current value I and an energizing time t of the magnet 24. By controlling the electric current value I and the energizing time t, it is possible to adjust the heat generation amount Q of the magnet 24 and also a heat temperature of the fixing member (material) 38. The electric current value I and the energizing time t can be predetermined through experimentation or the like. For example, it is possible to use a constant-current power source in which the electric voltage is controlled such that the electric current value I is held substantially constant. Further, it is possible to control the electric current value I or the electric voltage value in a feedback manner, by detecting the temperature of the magnet 24 or the fixing member (material) 38 by using, for example, a temperature sensor such as a thermocouple, such that the temperature becomes a predetermined value. Thus, since the fixing member (material) 38 is heated based on the heat generation amount Q of the magnet 24, it is necessary to select a material for the magnet 24, by taking account of a conductivity of the material, so that, for example, a neodymium magnet or other magnet having the conductivity can be advantageously used as the material for the magnet 24. Further, since the heat generation amount Q is affected by the electrical resistance of contact portions of the magnet 24 that are in contact with the electrodes 56, 58, it is preferable that, where the magnet 24 is covered with the insulation film, the opposite end faces 24a, 24b (see FIG. 3) as the contact portions are exposed, for example, by peeling off the insulation film in the opposite end faces 24a, 24b. One of the electrodes 56, 58 serves as a positive (+) electrode, while the other of the electrodes 56, 58 serves as a negative (−) electrode. In the present embodiment, the energization control device 62 applies the direct current to the magnet 24 so as to heat the magnet 24. However, an alternating current in place of the direct current may be applied to the magnet 24. In this case, the heat generation amount Q can be calculated by using an effective value of the alternating current as the electric current value I.

$$Q = RI^2 t \tag{1}$$

The coolant circulation unit 64 is provided to supply a cooling fluid for cooling the electrodes 56, 58, so as to suppress increase of temperature of the electrodes 56, 58, which is caused due to heat generated in themselves and transmission of heat from the magnet 24 thereto when the magnet 24 is energized and heated. The coolant circulation unit 64 is provided with a coolant chiller unit 66 that includes a water pump configured to discharge the cooling fluid such as water and a heat exchanger such as a radiator configured to cool the cooling fluid by a cooling fan or the like.

FIGS. 6 and 7 are views for specifically explaining a manufacturing process in accordance with which the rotor 12 is to be manufactured by using the above-described manufacturing apparatus 50. FIGS. 7A-7C correspond to steps S1-S3 shown in a flow chart of FIG. 6, respectively. FIGS. 7D and 7E correspond to step S4 shown in the flow chart of FIG. 6. FIG. 7F corresponds to step S5 shown in the flow chart of FIG. 6. The steps S1 and S2 shown in the flow chart of FIG. 6 correspond to "placing step" recited in the appended claims. The steps S3 and S4 shown in the flow chart of FIG. 6 correspond to "fixing step" recited in the appended claims.

Figure 7A:
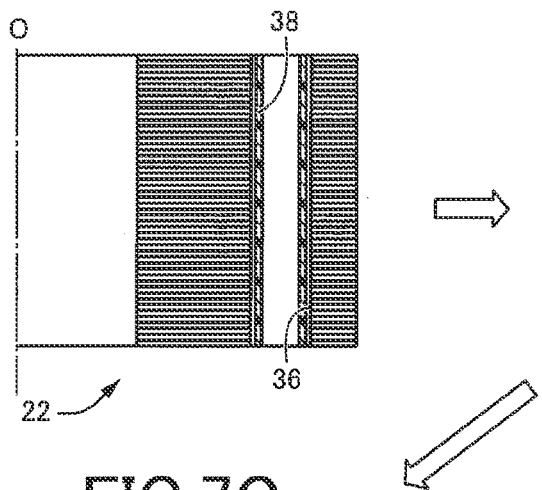
FIGS. 7A-7F are cross sectional views of the rotor core, for specifically explaining the manufacturing process of FIG. 6.

A control routine consisting of the steps S1-S5 shown in the flow chart of FIG. 6 is executed after the rotor core 22 has been attached to the holding device 52 of the manufacturing apparatus 50. The step S1 is implemented by the operation of the loader device or the manual operation made by the operator, to insert the fixing member (material) 38 into the magnet receiving hole 36 provided in the rotor core 22. In the present embodiment, at this step S1, the fixing member (material) 38 is inserted into the magnet receiving hole 36 that is positioned in the magnet fixing position M, namely, is inserted into one of the plurality of magnet receiving holes 36 which is positioned in the magnet fixing position M. However, at the step S1, the fixing member (material) 38 may be inserted into another one of the magnet receiving holes 36 which is adjacent to the above-described one of the magnet receiving holes 36 (which is positioned in the magnet fixing position M) and which is located on a rear side of the above-described one of the magnet receiving holes 36 (which is positioned in the magnet fixing position M) in a direction of rotation of the rotor core 22 made by the rotating device 54. Moreover, at the step S1, the fixing members (materials) 38 may be inserted into all of the magnet receiving holes 36, respectively. The fixing member (material) 38 is made from a thin plate that is formed to a rectangular tube larger than the magnet 24, and is to be held in the magnet receiving hole 36, for example, by its engagement with the magnet receiving hole 36. FIG. 7A shows a state in which the fixing member (material) 38 has been inserted into the magnet receiving hole 36 and is held in the magnet receiving hole 36.

Figure 7B:
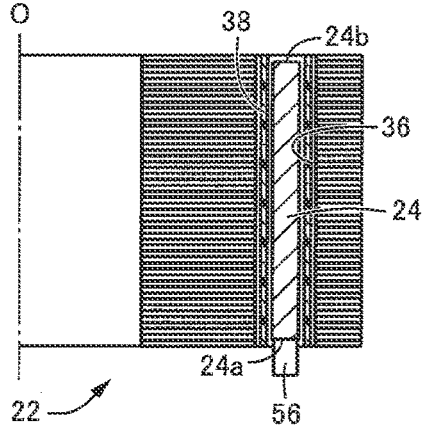

At the step S2, the magnet 24 is inserted into an inside of the tubular-shaped fixing member (material) 38 from an upper side of the magnet receiving hole 36 that is positioned in the magnet fixing position M, in a state in which the lower electrode 56 is held in the upper position, i.e., the supporting position. The insertion of the magnet 24 is made by the operation of the loader device the a manual operation of the operator. For example, the magnet 24 may be inserted into the inside of the fixing member (material) 38 by using, for example, an insertion robot. The inserted magnet 24 is brought into contact at its lower end face 24a with the lower electrode 56, so as to be supported on the lower electrode 56. FIG. 7B shows a state in which the magnet 24 has been inserted into the inside of the fixing member (material) 38 that is held in the magnet receiving hole 36, and is held on the lower electrode 56.

Figure 7C:
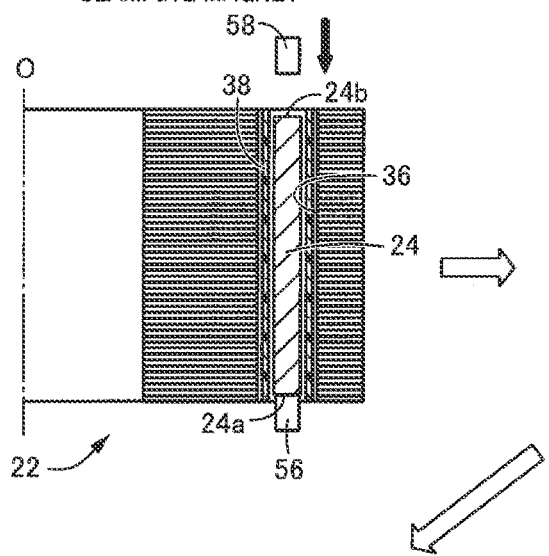

At the step S3, the upper electrode 58 is moved by the pressing device 60, downwardly from the upper position, i.e., the withdrawn position, to the lower position, i.e., the pressing position in which the upper electrode 58 is brought into contact with the upper end face 24b of the magnet 24, whereby the magnet 24 is clamped between the lower and upper electrodes 56, 58 with the pressing force that is a predetermined constant force. FIG. 7C shows a state in which the upper electrode 58 is in process of the downward movement away from the withdrawn position toward the pressing position.

Figure 7D:
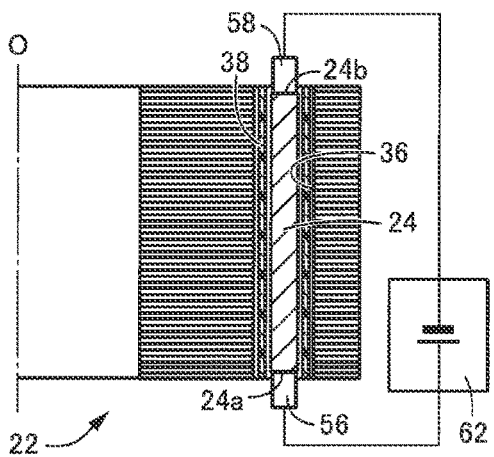
Figure 7E:
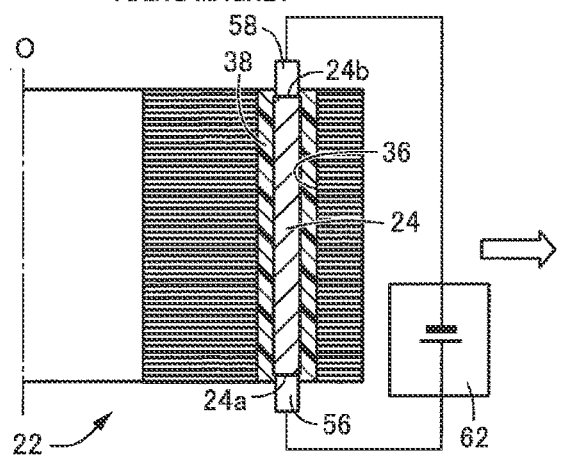

At the step S4, the electric direct-current voltage is applied between the electrodes 56, 58 by the energization control device 62 in a state in which the magnet 24 is clamped between the lower and upper electrodes 56, 58 with the constant pressing force by the constant pressing-force control of the pressing device 60, whereby the direct current is applied to the magnet 24 through the electrodes 56, 58. FIG. 7D shows a state in which the electric direct-current voltage is applied between the electrodes 56, 58. With application of the direct current to the magnet 24, the magnet 24 is heated by the joule heat generated by the application of the direct current thereto, and the fixing member (material) 38 is also heated together with the magnet 24. Then, the magnet 24 is fixed to the rotor core 22, by expansion or curing of the fixing member (material) 38 which is caused by heating of the fixing member (material) 38. FIG. 7E shows a case in which the fixing member (material) 38 is constituted by the composite material that includes the fiber member 40 and the binder 42 as shown in FIG. 4, so that the fiber member 40 is caused to expand together with softening of the binder 42, whereby the clearance between the magnet 24 and the magnet receiving hole 36 is filled with the expanding fixing member 38, and the magnet 24 is fixed to the rotor core 22. It is noted that, in FIGS. 7D and 7E, the lower electrode 56 serves as the positive (+) electrode, while the upper electrode 58 serves as the negative (−) electrode.

Figure 7F:
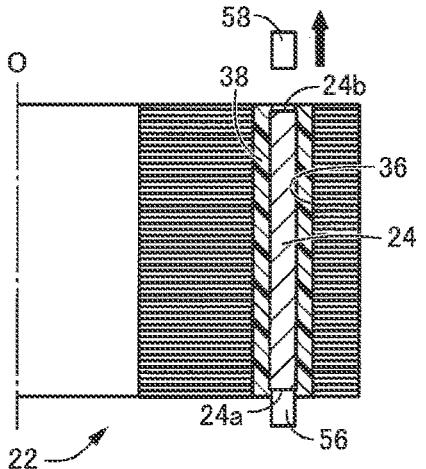

At the step S5, the upper electrode 58 is moved upwardly, by the pressing device 60, from the lower position, i.e., the pressing position, to the upper position, i.e., the withdrawn position, so that the clamping by the electrodes 56, 58 is released whereby the magnet 24 is unclamped. FIG. 7F shows a state in which the upper electrode 58 is in process of the upward movement away from the pressing position toward the withdrawn position. Then, the lower electrode 56 is moved downwardly to the withdrawn position, and the rotor core 22 is rotated about the axis O by the rotating device 54 by a certain degree of angle that is required to position the next magnet receiving hole 36 in the magnet fixing position M. With the steps S1-S5 being implemented repeatedly, the magnets 24 are fixed into all of the magnet receiving holes 36 through the fixing member 38.

In the method of manufacturing the rotor 12 by using the manufacturing apparatus 50 according to the present embodiment, the magnet 24 and the fixing member (material) 38 are placed in the magnet receiving hole 36 of the rotor core 22 such that the fixing member (material) 38 is positioned between the magnet receiving hole 36 and the magnet 24, and then the electric current is applied to the magnet 24 through the electrodes 56, 58 brought in contact with the opposite end portions of the magnet 24, so as to heat the fixing member (material) 38 by the heat generated by the electrical resistance of the magnet 24, so that the magnet 24 is fixed to the magnet receiving hole 36 by the expansion or curing of the heated fixing member (material) 38. Therefore, a heating furnace is not needed, and it is possible to reduce time and energy required for the heating.

Further, the heat temperature of the fixing member (material) 38 is dependent on the heat generation amount Q of the magnet 24, wherein the heat generation amount Q can be easily adjusted by the electric current value I of the direct current and the energizing time t that are controlled by the energization control device 62. Thus, the fixing member (material) 38 can be appropriately heated depending on the heat generation amount Q whereby the magnet 24 can be appropriately fixed into the magnet receiving hole 36 through the fixing member 38, so that it is possible to appropriately prevent a fixing failure that could be caused if the heat temperature is too low and a deterioration of the rotor core and/or the magnet that could be caused if the heat temperature is too high. For example, if the heat temperature is too high, an insulation film made of a steel plate and constituting the rotor core 22 and also the insulation film of the magnet 24 could be damaged or deteriorated. Further, where the magnet 24 is a grain boundary diffusion magnet in which rare metals such as dysprosium Dy and terbium Tb are grain boundary segregated, the segregated elements could be cause to spread by excessive heating and heat resistance of the magnet 24 could be reduced.

Further, the energization control device 62 is configured to apply the direct current as the electric current to the magnet 24 so as to heat the magnet 24, so that it is possible to more appropriately heat only the magnet 24 so as to heat the fixing member (material) 38, as compared with an arrangement in which the alternating current is applied to the magnet 24. In the arrangement in which the magnet 24 is heated by applying the alternating current to the magnet 24, an induced current is generated in the rotor core 22 due to an electromagnetic induction. Therefore, in a case in which a narrow portion having a small width is present, for example, between each adjacent two of the magnet receiving holes 36, a current density could become so high in the narrow portion whereby the narrow portion could be excessively heated so that there is a risk that the narrow portion could be burned out, for example. However, in the present embodiment in which the direct current is applied to magnet 24, the excessive heating of the rotor core 22 can be suppressed.

Further, the electrodes 56, 58 are pressed against the magnet 24 by the predetermined constant pressing force by the constant pressing-force control of the pressing device 60. Therefore, irrespective of possible variation of the dimension of the magnet 24, the electrical resistance in the contact portions of the magnet 24 held in contact with the electrodes 56, 58 is held substantially constant whereby the electric current value I flowing in the magnet 24 and the heat generation amount Q are held substantially constant so that the fixing member (material) 38 can be appropriately heated.

Further, the rotor core 22 is provided with the plurality of magnet receiving holes 36 in respective portions about the axis O, and the plurality of magnets 24 are to be fixed in the respective magnet receiving holes 36. The manufacturing apparatus 50 includes the rotating device 54 configured to rotate the holding device 52 that holds the rotor core 22, about the axis O of the rotor core 22. The pressing device 60 is disposed in the magnet fixing position M, which is the predetermined position about the axis O, and is configured to press the electrodes 56, 58 against the magnet 24 that is placed in the magnet receiving hole 36 positioned in the magnet fixing position M. Therefore, with the rotor core 22 being rotated about the axis O by the rotating device 54, the plurality of magnets 24 can be sequentially fixed into the respective magnet receiving holes 36. That is, the manufacturing apparatus 50 can be constructed more easily and made more compact in size at a lower cost, as compared with in an arrangement in which the plurality of magnets 24 and the plurality of fixing members (materials) 38 are placed in the respective magnet receiving holes 36 of the rotor core 22 and then the electrodes 56, 58 are pressed against the plurality of magnets 24 so as to be energized concurrently with each other.

There will be described other embodiments of the present invention. The same reference signs as used in the above-described embodiment will be used in the following embodiments, to identify the functionally corresponding elements, and descriptions thereof are not provided.

Figure 8:
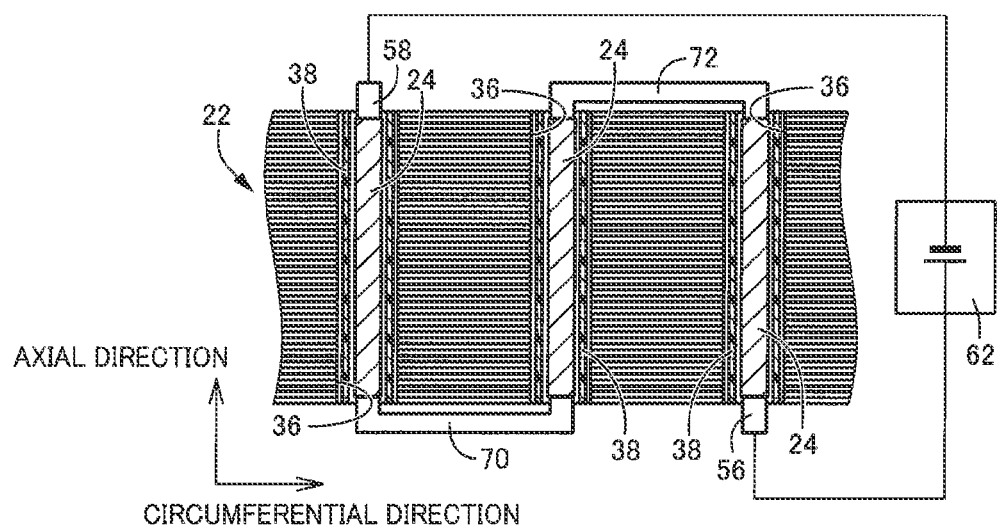
FIG. 8 is a cross sectional view of the rotor core, for explaining an example of an arrangement in which a plurality of magnets, which are placed in respective magnet receiving holes provided in the rotor core, are electrically connected in series, so as to be energized concurrently each other.

FIG. 8 is a cross sectional view of the rotor core 22 taken in a circumferential plane about the axis O. In an arrangement shown in FIG. 8, three of the magnets 24, which are placed in respective three of the magnet receiving holes 36 and which are positioned in the magnet fixing position M, are electrically connected in series, so as to be energized concurrently each other. In this arrangement, the pressing device 60 includes two connecting electrodes 70, 72, i.e., a lower connecting electrode 70 and an upper connecting electrode 72, in addition to the pair of electrodes 56, 58 between which the electric direct-current voltage is to be applied, such that the two connecting electrodes 70, 72 are disposed on respective axially opposite sides of the rotor core 22 and such that each of the two connecting electrodes 70, 72 is pressed against end portions of respective two of the three magnets 24 so as to electrically connect between the two of the three magnets 24, so that the three magnets 24 are electrically connected in series between the lower and upper electrodes 56, 58. The lower connecting electrode 70 is vertically moved together with the lower electrode 56 by the lower-side moving device 57 between the withdrawn position and the supporting position. The upper connecting electrode 72 is vertically moved together with the upper electrode 58 by the upper-side moving device 59 between the withdrawn position and the pressing position. In this arrangement, three of the magnets 24 placed in respective three of the magnet receiving holes 36 can be concurrently heated so as to concurrently heat corresponding three of the fixing members (materials) 38, and accordingly the three magnets 24 can be concurrently fixed to the rotor core 22, so that the magnets 24 can be fixed to the rotor core 22 with an improved efficiency. Further, since three of the magnets 24 are electrically connected in series, the three magnets 24 are the same in terms of the electric current value I and are substantially the same in terms of the heat generation amount Q, so that it is possible to suppress variation between the three magnets 24 in terms of strength of fixing of the magnets 24 owing to the heating of the fixing members (materials) 38. It is noted that, in the arrangement shown in FIG. 8, the pair of electrodes 56, 58 and the connecting electrodes 70, 72 correspond to "electrodes" recited in the appended claims.

Although three of the magnets 24 are connected in series in the arrangement shown in FIG. 8, two of the magnets 24 or four or more of the magnets 24 may be connected in series. The pair of electrodes 56, 58, between which the direct-current voltage is to be applied, are placed on respective axially opposite sides of the rotor core 22, where the number of the magnets 24 connected in series is an odd number, as in the arrangement shown in FIG. 8. However, where the number of the magnets 24 connected in series is an even number, the pair of electrodes 56, 58 may be placed in either one of the axially opposite sides of the rotor core 22. Further, it is possible to electrically connect two or more of the magnets 24 in parallel with each other, so that the two or more magnets 24 are concurrently energized with the direct current.

Figure 9:
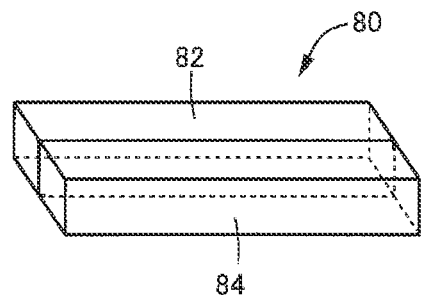
FIG. 9 is a perspective view for explaining another example of the magnet used in the rotor of FIG. 2, wherein the magnet is constituted by two divided magnets.
Figure 10:
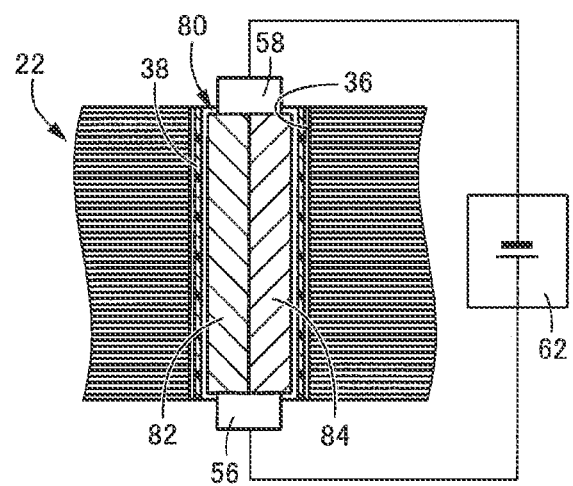
FIG. 10 is a cross sectional view of the rotor core, for explaining an arrangement in which a standard electrode is brought into contact at its entire distal end with the magnet of FIG. 9 that is constituted by the two divided magnets, so as to energize the magnet.
Figure 11:
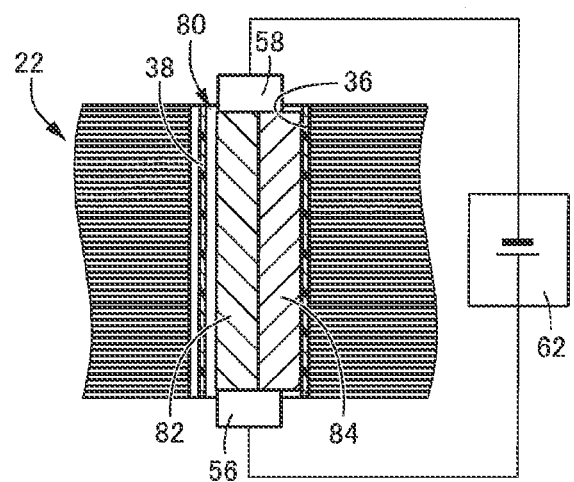
FIG. 11 is a cross sectional view of the rotor core, for exampling a case in the arrangement shown in FIG. 10 in which the magnet of FIG. 9 (that is constituted by the two divided magnets) is placed in a position offset from a centerline of the magnet receiving hole.

FIGS. 9-11 show an arrangement in which each of the above-described magnets 24 is replaced by a magnet 80 including two divided magnets 82, 84 that are divided by a plane, which is parallel to the axis O of the rotor core 22 when the magnet 80 is fixed to the rotor core 22. As in the above-described embodiments, it is possible to use the standard electrodes 56, 58 each of which is to be brought into contact at its entire distal end with the two divided magnets 82, 84 of the magnet 80, for energizing the two divided magnets 82, 84, whereby the fixing member (material) 38 can be heated by heating of the two divided magnets 82, 84. In this arrangement in which each of the magnets 80 provided in the rotor 12 is constituted by the plurality of divided magnets 82, 84, when the rotating electric machine 10 including the rotor 12 provided with the magnets 80 (each constituted by the plurality of divided magnets 82, 84) is actually used, an eddy current loss in each of the divided magnets 82, 84 is reduced owing to the divisions of each magnet 80, and the more the eddy current loss is reduced the more the number of the divisions of each magnet 80 is, so that the efficiency of the rotating electric machine 10 is increased. It is noted that the plurality of divided magnets 82, 84 corresponds to "divided portions (included in the at least one magnet)" recited in the appended claims.

However, for example, in a case, as shown in FIG. 11, in which the magnet 80 (that is constituted by the two divided magnets 82, 84) is placed in a position offset from a centerline of the magnet receiving hole 36, the divided magnets 82, 84 are in contact at their contact surfaces with each of the electrodes 56, 58 wherein the contact surfaces of the respective divided magnets 82, 84 are different in area from each other, so that the electrical resistance in the contact portion of the divided magnet 82 and the electrical resistance in the contact portion of the divided magnet 84 are different from each other whereby the heat generation amount Q in the divided magnet 82 and the heat generation amount Q in the divided magnet 84 are made different from each other. In an example shown in FIG. 11, the magnet 80 is placed in the position offset from the centerline of the magnet receiving hole 36 rightwardly, so that the contact surface of the left-side divided magnet 82 with each of the electrodes 56, 58 is larger in area than the contact surface of the right-side divided magnet 84 with each of the electrodes 56, 58. Therefore, the electrical resistance in the contact portion of the left-side divided magnet 82 is smaller than the electrical resistance in the contact portion of the right-side divided magnet 84, whereby the electric current value I and the heat generation amount Q in the left-side divided magnet 82 are larger than those in the right-side divided magnet 84. Due to the difference or variation of the heat generation amount Q, the heat temperature of the fixing member (material) 38 could vary portion to portion, so that fixing failure could be caused in a portion of the lower heat temperature while the magnet 80 could be deteriorated in a portion of the higher heat temperature.

Figure 12:
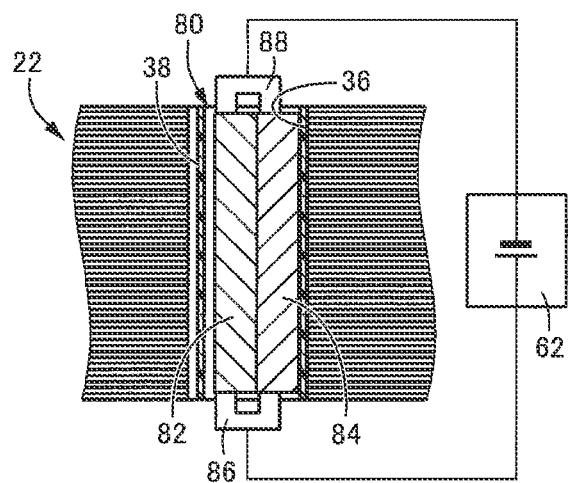
FIG. 12 is a cross sectional view corresponding to the cross sectional view of FIG. 11, for explaining an arrangement in which a fork-shaped electrode including two branch portions is used to energize the magnet of FIG. 9 (that is constituted by the two divided magnets), with the two branch portions being brought into contact with end portions of the respective two divided magnets of the magnet, independently of each other.

On the other hand, in an arrangement, as shown in FIG. 12, in which fork-shaped electrodes 86, 88 each including two branch portions are used to energize the magnet 80 (that is constituted by the two divided magnets 82, 84), with the two branch portions being brought into contact with end portions of the respective two divided magnets 82, 84 of the magnet 80, independently of each other; the contact surfaces of the respective divided magnets 82, 84 with each of the electrodes 56, 58 are substantially the same in area as each other, irrespective of positional offset (positional deviation) of the magnet 80 from the centerline of the magnet receiving hole 36, so that the electrical resistance in the contact portion of the left-side divided magnet 82 is substantially equal to the electrical resistance in the contact portion of the right-side divided magnet 84, whereby the electric current value I and the heat generation amount Q in the left-side divided magnet 82 are substantially equal to those in the right-side divided magnet 84. Therefore, it is possible to increase the temperature substantially evenly in the two divided magnets 82, 84 and to heat substantially evenly the entirety of the fixing member (material) 38 whereby the two divided magnets 82, 84 can be appropriately fixed to the rotor core 22. That is, a robustness against the positional offset or deviation can be improved, and reduction of the magnet performance and insufficiency of the fixing strength, which could be caused due to variation of the heat generation amount Q, can be suppressed.

Figure 13:
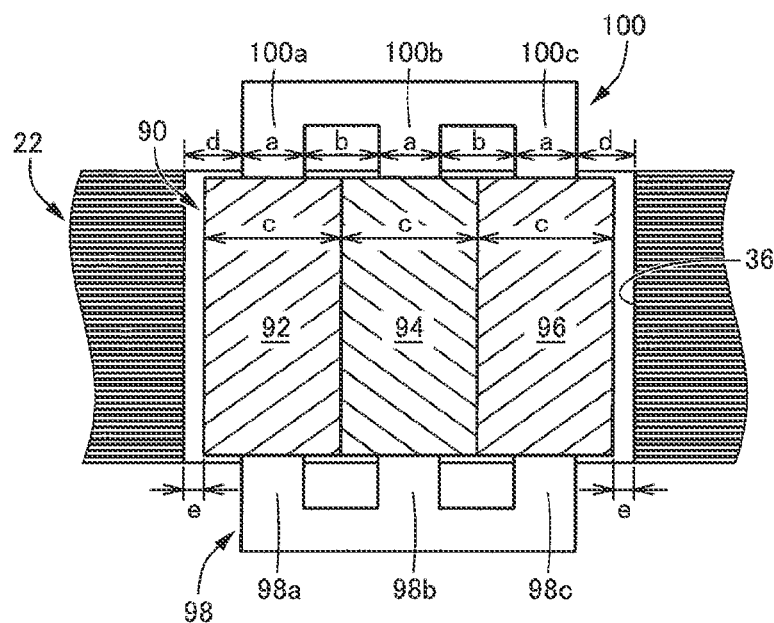
FIG. 13 is a cross sectional view of the rotor core, for explaining an arrangement in which a fork-shaped electrode including three branch portions is used to energize a magnet that is constituted by three divided magnets.
Figure 14:
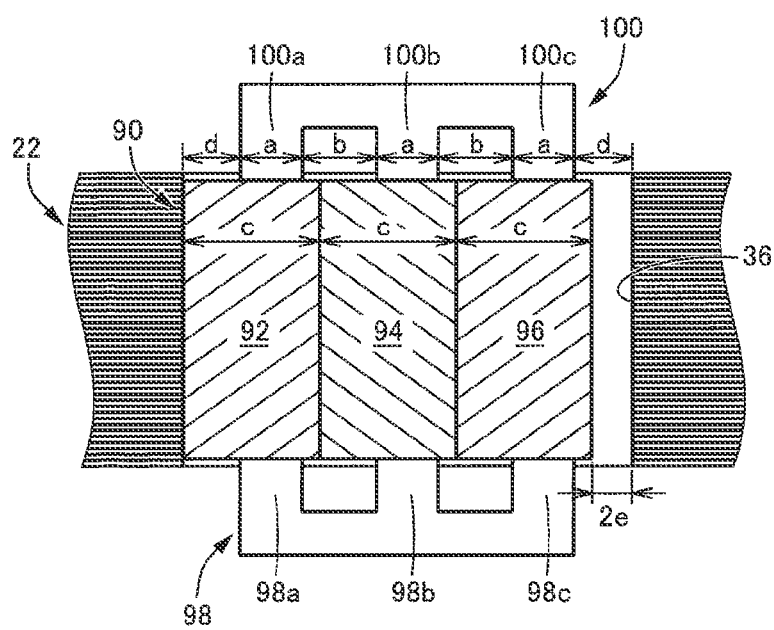
FIG. 14 is a cross sectional view of the rotor core, for exampling a case in the arrangement shown in FIG. 13 in which the magnet (that is constituted by the three divided magnets) is placed in a position offset from the centerline of the magnet receiving hole.

FIGS. 13 and 14 shows an arrangement in which each of the above-described magnets 24 is replaced by a magnet 90 including three divided magnets 92, 94, 96 while fork-shaped electrodes 98, 100 each including three branch portions is used to energize the magnet 90 (that is constituted by the three divided magnets 92, 94, 96), with the three branch portions being brought into contact with end portions of the respective three divided magnets 92, 94, 96 of the magnet 90, independently of each other. In this arrangement, substantially the same effects as in the above-described arrangement shown in FIG. 12 can be obtained. There will be discussed conditions required to reliably cause the three branch portions 98a, 98b, 98c of the fork-shaped electrode 98 and the three branch portions 100a, 100b, 100c of the fork-shaped electrode 100 to be brought into contact at their distal ends with end faces with the three divided magnets 92, 94, 96 of the magnet 90. As shown in FIGS. 13 and 14, each of the electrodes 98, 100 has a symmetrical shape, and a width of each of the three branch portions 100a, 100b, 100c of the upper electrode 100 will be referred to as "width a", an interval between each adjacent two of the three branch portions 100a, 100b, 100c will be referred to as "interval b", a width of each of the three divided magnets 92, 94, 96 will be referred to as "width c" and a play or gap between the electrode 100 and the magnet receiving hole 36 will be referred to as "gap d". Further, where a centerline of a total of widths (=3c) of the respective three divided magnet 92, 94, 96 is coincident with a centerline of the electrode 100, and the width a and the interval b are determined such that centerlines of the respective three branch portions 100a, 100b, 100c are coincident with centerlines of the respective divided magnet 92, 94, 96, respectively, a relationship among the width a, the interval b and the width c is represented by expression (2) given below, which can be converted into expression (3) given below. Further, the width a of each of the three branch portions 100a, 100b, 100c is smaller than the width c of each of the three divided magnets 92, 94, 96 as represented by expression (4) given below. Still further, where the centerline of the total of widths (=3c) of the respective three divided magnet 92, 94, 96 is coincident with the centerline of the magnet receiving hole 36, a clearance e in each of opposite sides is represented by expression (5) given below.

$$(c-a)/2 = b/2 \quad (2)$$

$$b = c-a \quad (3)$$

$$a < c \quad (4)$$

$$e = d-(c-a)/2 \quad (5)$$

FIG. 14 shows a case in which the magnet 90 (that is constituted by the three divided magnets 92, 94, 96) is placed in a position offset leftwardly from the centerline of the magnet receiving hole 36 so that the right-side clearance is represented by 2e that is corresponds to a left side of expression (6) given below, which can be obtained by converting the expression (5) given above. In the case shown in FIG. 14, a condition required to avoid a right end of the electrode 100 from protruding from a right end of the divided magnet 96, is represented by expression (7) given below, which can be converted into expression (8) given below. That is, with each of the dimensions a, c, d being determined to satisfy the expression (8), all of the distal ends of the branch portions 100a, 100b, 100c of the electrode 100 are held in contact at their entire surfaces with the end faces of the respective divided magnets 92, 94, 96 of the magnet 90, so that the electrical resistances in the contact portions of the respective divided magnets 92, 94, 96 are substantially equal to one another, whereby the electric current value I and the heat generation amount Q in the respective divided magnets 92, 94, 96 are substantially equal to one another.

$$2e = 2d-c+a \quad (6)$$

$$2d-c+a \leq d \quad (7)$$

$$a \leq c-d \quad (8)$$

The condition represented by the above expression (8) is applied also to the arrangement shown in FIG. 12 in which the fork-shaped electrodes 86, 88 each including the two branch portions is used and an arrangement in which fork-shaped electrodes each including four or more branch portions is used. The above expression (8) was obtained with a thickness f of the tubular-shaped fixing member (material) 38 made from the thin plate being ignored. However, with the thickness f being taken into account, the clearance 2e shown in FIG. 14 is reduced by the thickness f Therefore, each of the dimensions a, c, d can be determined depending on the thickness f, such that expression (9) given below is satisfied.

$$a \leq c-d+f \quad (9)$$

Figure 15:
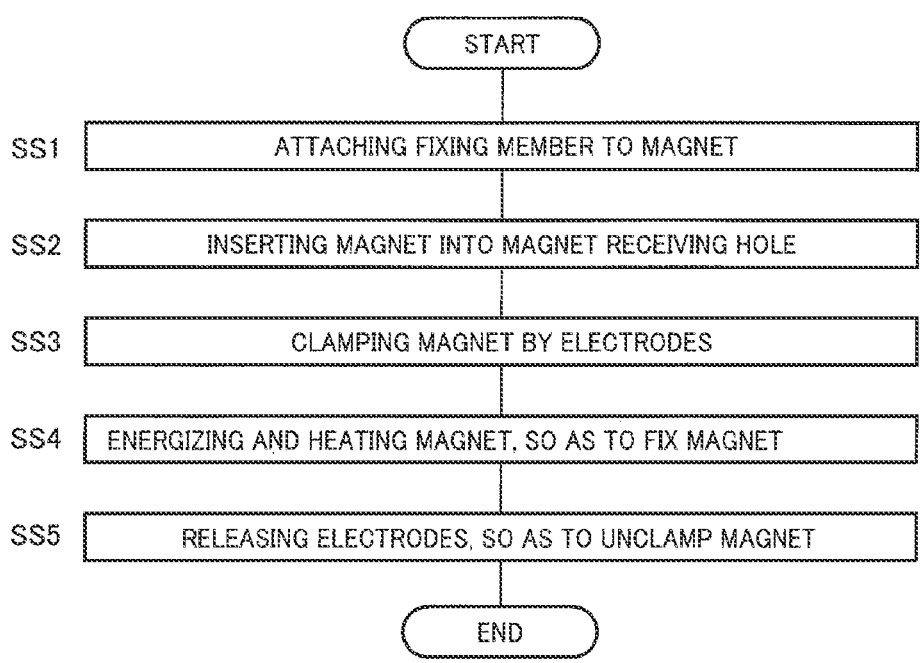
FIG. 15 is a flow chart for explaining another example of the manufacturing process of manufacturing the rotor.
Figure 16A:
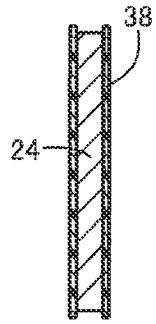
FIGS. 16A-16F are cross sectional views of the rotor core, for specifically explaining the manufacturing process of FIG. 15.
Figure 16B:
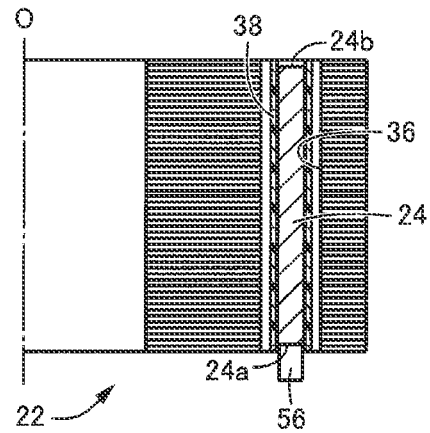
Figure 16C:
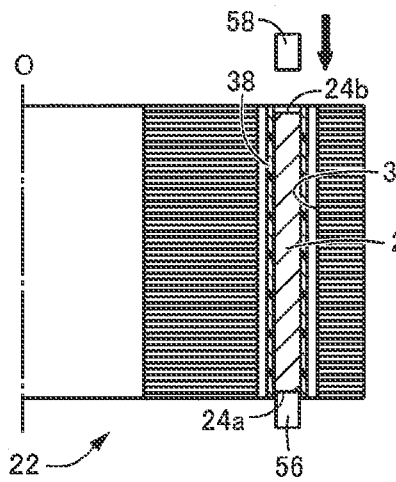
Figure 16D:
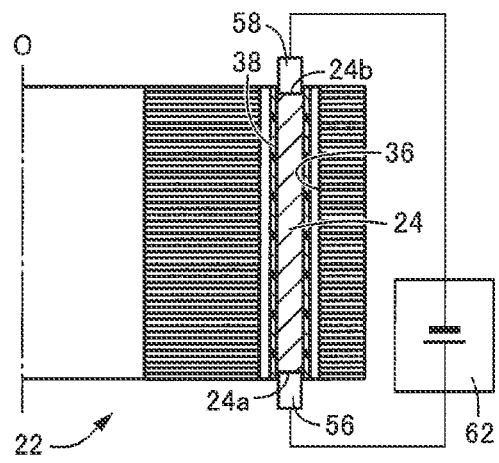
Figure 16E:
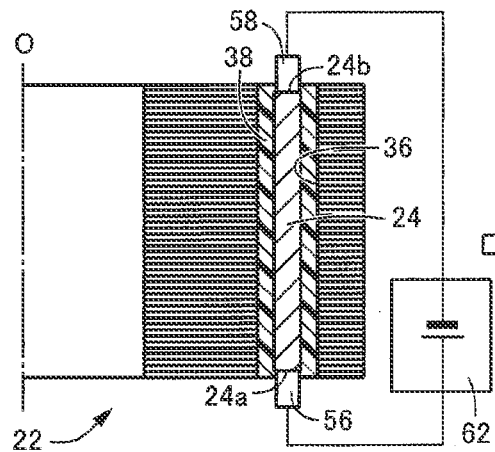
Figure 16F:
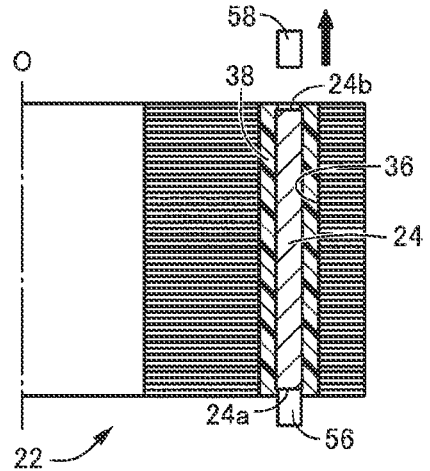

FIG. 15 is a flow chart for explaining another example of the manufacturing process of manufacturing the rotor 12 by using the manufacturing apparatus 50 shown in FIG. 5. FIGS. 16A-16F, which corresponds to FIGS. 7A-7F, are cross sectional views of the rotor core 22, for specifically explaining the manufacturing process shown in the flow chart of FIG. 15. The manufacturing process is initiated with step SS11 that is implemented to pre-attach the fixing member (material) 38 onto the outer circumferential surface of the magnet 24, by winding the fixing member (material) 38 having the thin-plate shape, onto the outer circumferential surface of the magnet 24, adhering the fixing member (material) 38 onto a part of the outer circumferential surface of the magnet 24, or fitting the magnet 24 into the inside of the fixing member (material) 38 having the tubular shape. The fixing member (material) 38 may be attached onto the outer circumferential surface of the magnet 24, by using preferably an adhesive, for example. However, the fixing member (material) 38 can be attached by any one of various methods such as crimping and hydraulic transfer. FIG. 16A shows a state in which the fixing member (material) 38 has been attached onto the entire outer circumferential surface of the magnet 24. Next, step SS2 is implemented to insert the magnet 24 onto which the fixing member (material) 38 has been attached, into the magnet receiving hole 36 positioned in the magnet fixing position M, from an upper side of the magnet receiving hole 36. FIG. 16B shows a state in which the magnet 24, onto which the fixing member (material) 38 is attached, has being inserted into the magnet receiving hole 36 and is supported on the electrode 56. In the present embodiment, these steps SS1 and SS2 correspond to "placing step" recited in the appended claims. Steps SS3-SS5 are substantially the same as the above-described steps S3-S5 shown in the flow chart of FIG. 6, respectively. Steps SS3 and SS4 correspond to "fixing step" recited in the appended claims.

In the present embodiment shown in FIGS. 15 and 16, substantially the same effects as in the above-described embodiments can be obtained, and since the magnet 24 is inserted into the magnet receiving hole 36 after the fixing member (material) 38 has been attached to the magnet 24, a positional misalignment of the fixing member (material) 38 relative to the magnet 24 can be suppressed and accordingly the magnet 24 can be appropriately fixed in the magnet receiving hole 36 through the fixing member 38. It is noted that, in the arrangements or embodiments shown in FIGS. 8-14, too, as in the present embodiment, the magnet (24; 80; 90) may be inserted into the magnet receiving hole 36 after the fixing member (material) 38 has been attached to the magnet (24; 80; 90).

Figure 17:
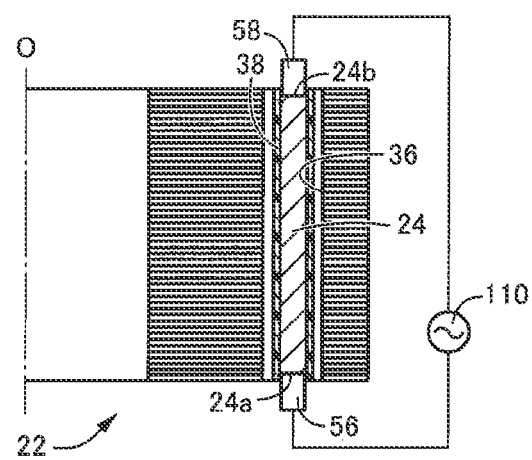
FIG. 17 is a cross sectional view corresponding to the cross sectional view of FIG. 7D (which shows an energization heating step), for explaining an embodiment in which the magnet is energized with an alternating current.

FIG. 17 is a cross sectional view corresponding to the cross sectional view of FIG. 7D (which shows an energization heating step), for explaining an embodiment in which an alternating current is applied to the magnet 24 through the electrodes 56, 58 by an energization control device 110. In this embodiment, too, the magnet 24 and the fixing member (material) 38 are inserted into the magnet receiving hole 36 of the rotor core 22, and then the alternating current as the electric current is applied to the magnet 24 through the electrodes 56, 58 brought in contact with the opposite end portions of the magnet 24, by operation of the energization control device 110, so as to heat the fixing member (material) 38 by the heat generated by the electrical resistance of the magnet 24, so that the magnet 24 is fixed to the magnet receiving hole 36 of the rotor core 22 by the expansion or curing of the heated fixing member (material) 38. Therefore, a heating furnace is not needed, and it is possible to reduce time and energy required for the heating. That is, substantially the same effects as in the above-described embodiments can be obtained. Further, with application of the alternating current to the magnet 24, the electric resistance value R in the magnet 24 is increased due to a skin effect in which the current flows in a portion close to a surface of the magnet 24, whereby the heat generation amount Q is increased, so that the heating can be made efficiently with the electric current value I being made smaller, as compared with the application of the direct current to the magnet 24.

Figure 18:
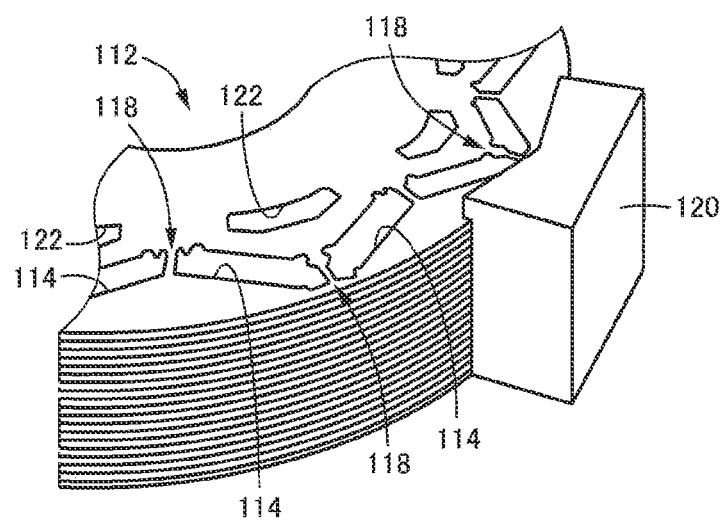
FIG. 18 is a perspective view for explaining, in the embodiment of FIG. 17, an arrangement in which a chiller block is brought into contact with an outer peripheral portion of the rotor core when the magnets are to be fixed to the rotor core.

It is noted that, in the arrangements or embodiments shown in FIGS. 8-16, too, as in the present embodiment, the magnet (24; 80; 90) may be energized with the alternating current.

Where the alternating current is used, an induced current is generated around the magnet 24 due to an electromagnetic induction. Therefore, in a case in which a narrow portion 118 having a small width is present between each adjacent two of magnet receiving holes 114 in a circumferential direction or between each of the magnet receiving holes 114 and an outer circumferential surface, for example, as in a rotor core 112 shown in FIG. 18, a current density could become so high in the narrow portion 118 whereby the narrow portion 118 could be excessively heated so that there is a risk that the narrow portion 118 could be burned out, for example. Therefore, it is preferable that a chiller block 120 is provided in a portion of the outer circumferential surface of the rotor core 112 which is close to the narrow portion 118, so that the heat generated due to the induced current can be absorbed by the chiller block 120 so as to suppress the excessive heating of the narrow portion 118, when the alternating current is applied to the magnet 24 by the energization control device 110 so as to fix the magnet 24 into the magnet receiving hole 114 after the magnet 24 and the fixing member (material) 38 have been inserted into the magnet receiving hole 114. The chiller block 120 is made of a suitable material such as a copper alloy having a high thermal conductivity. It is noted that reference sign "122" denotes a magnetic-flux bypass hole which is provided on an inner peripheral side of the magnet receiving hole 114 so as to limit a path of the magnetic flux.

Figure 19:
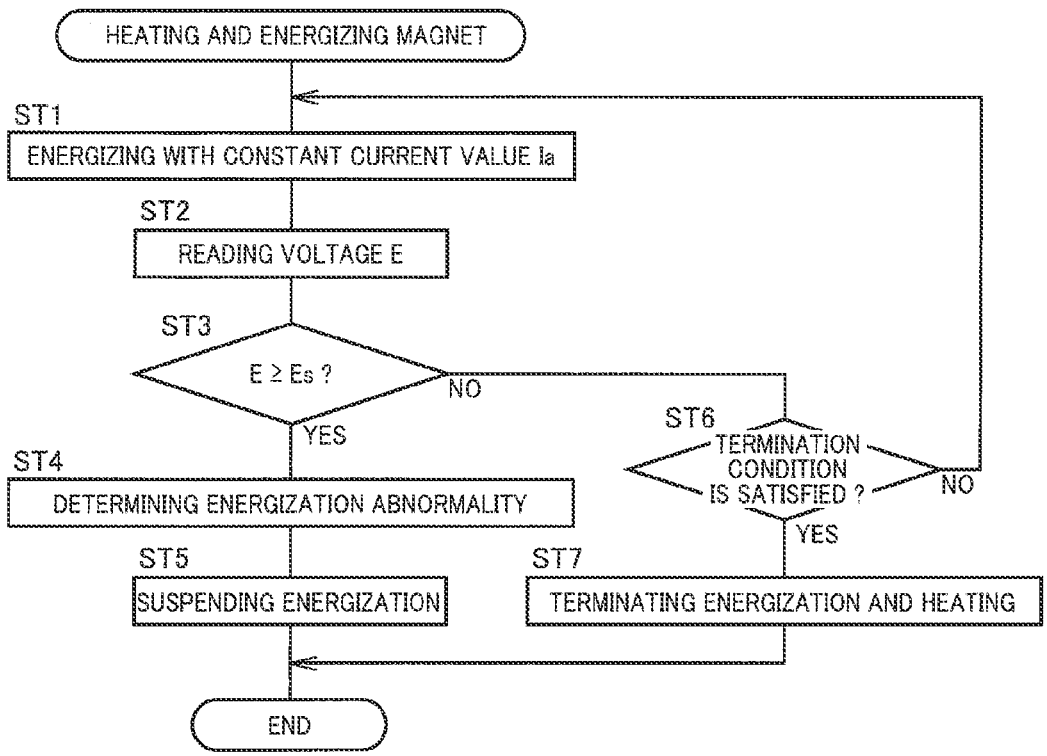
FIG. 19 is a flow chart for explaining a control routine that is to be executed at the energization heating step (corresponding to step S4 shown in FIG. 6 or step SS4 shown in FIG. 15 at which the magnet is heated by energization so as to be fixed to the rotor core), for determining occurrence of an energization abnormality depending on a voltage.

FIG. 19 is a flow chart for explaining a control routine that is to executed at the energization heating step (corresponding to step S4 shown in FIG. 6 or step SS4 shown in FIG. 15 at which the magnet 24 is energized and heated so as to be fixed into the magnet receiving hole 36), for determining occurrence of an energization abnormality depending on a voltage E. This control routine is executed by the energization control device 62. The energization control device 62 is provided with an electronic control device including a microcomputer, and is configured to execute a signal processing in accordance with a predetermined program so as to energize and heat the magnet 24 through the control routine shown in the flow chart of FIG. 19. The control routine is initiated with step ST1 that is implemented to control the voltage E applied between the electrodes 56, 58 such that the magnet 24 is energized with a predetermined constant electric current value Ia by, for example, the constant-current power source. With the magnet 24 being energized and heated with the constant electric current value Ia, the heat generation amount Q of the magnet 24 is held substantially constant, as is apparent from the expression (1) given above, so that the magnet 24 can be appropriately fixed into the magnet receiving hole 36 by heating of the fixing member (material) 38 caused by heating of the magnet 24.

If failure of contact between the electrodes 56, 58 and the magnet 24 is caused by, for example, entrance of foreign objects therebetween, wears of the electrodes 56, 58 or inclination of the magnet 24, the magnet 24 could be thermally cracked or the fixing member 38 could be thermally deteriorated, due to a thermal expansion variation caused by a locally abnormal heating, so that the fixing strength of the magnet 24 could be reduced as a result of the thermal cracking or deterioration. The locally abnormal heating caused by the contact failure is hard to be confirmed from outside. However, since the voltage E is extremely increased if the electrical resistance is increased due to the contact failure between the electrodes 56, 58 and the magnet 24, the contact failure can be detected based on the voltage E. In the control routine shown in the flow chart of FIG. 19, step ST2 is implemented to read the voltage E detected by a voltmeter or the like, and step ST3 is implemented to monitor whether the detected voltage E is at least a predetermined abnormality determination value Es or not. The voltage E is dependent on, not only a specific resistance value R of the magnet 24, but also an electric resistance of the electrodes 56, 58, an electric resistance in contacts between the magnet 24 and the electrodes 56, 58 and an electric resistance in a connection wire between the current power source and the electrodes 56, 58. Where values of these electric resistances are substantially constant, a value of the voltage E required to energize the magnet 24 with the constant electric current value Ia is substantially constant. On the other hand, in the event of the locally abnormal heating (excessive heating) due to the contact failure between the electrodes 56, 58 and the magnet 24, .the required value of the voltage E is excessively increased due to increase of the electrical resistance caused by the contact failure. Therefore, the abnormality determination can be made by setting the abnormality determination value Es to a voltage value that is at least 1.5 times as high as the required value of the voltage E in a normal case (non-failure case). The abnormality determination value Es can be set to a suitable value through, for example, an experimentation or simulation. The setting of the abnormality determination value Es can be made by checking situations of the thermal cracking of the magnet 24 and the thermal deterioration of the fixing member 38 in an experimental case in which the contact failure is intentionally caused, for example, by inclining the magnet 24.

When the detected voltage E is not smaller than the abnormality determination value Es (E≥Es), it is determined at step ST4 that the energization abnormality occurs, and step ST5 is implemented to suspend the energization. When the detected voltage E is smaller than the abnormality determination value Es (E<Es), step ST3 is followed by step ST6 that is implemented to determine whether a termination condition for terminating the energization and heating is satisfied or not. The termination condition is a condition that is required to enable the magnet 24 to be reliably fixed into the magnet receiving hole 36 through the fixing member 38, and is a predetermined heating time, for example. When the termination condition is satisfied, for example, when the predetermined heating time elapses, step ST7 is implemented to terminate the energization and heating. The energization and heating is continued by repeatedly implementing the step ST1 and subsequent steps until the termination condition is satisfied.

In the present embodiment, the voltage E of the electric current applied to the magnet 24 is controlled such that the magnet 24 is energized with the constant current value Ia. Therefore, since the heat generation amount Q in the energized and heated magnet 24 is held substantially constant, the magnet 24 can be appropriately fixed to the rotor core 22, by heating of the fixing member (material) 38 caused by the heating of the magnet 24. Further, it is monitored whether the voltage E is the predetermined abnormality determination value Es or higher, and it is determined that an abnormality occurs and the application of the electric current to the magnet 24 is suspended when the voltage E is not smaller than the predetermined abnormality determination value Es, so that it is possible to prevent the thermal crack of the magnet 24 and the deterioration of the fixing member 38, which could be caused by the locally abnormal heating due to the contact failure between the electrodes 56, 58 and the magnet 24.

Figure 20:
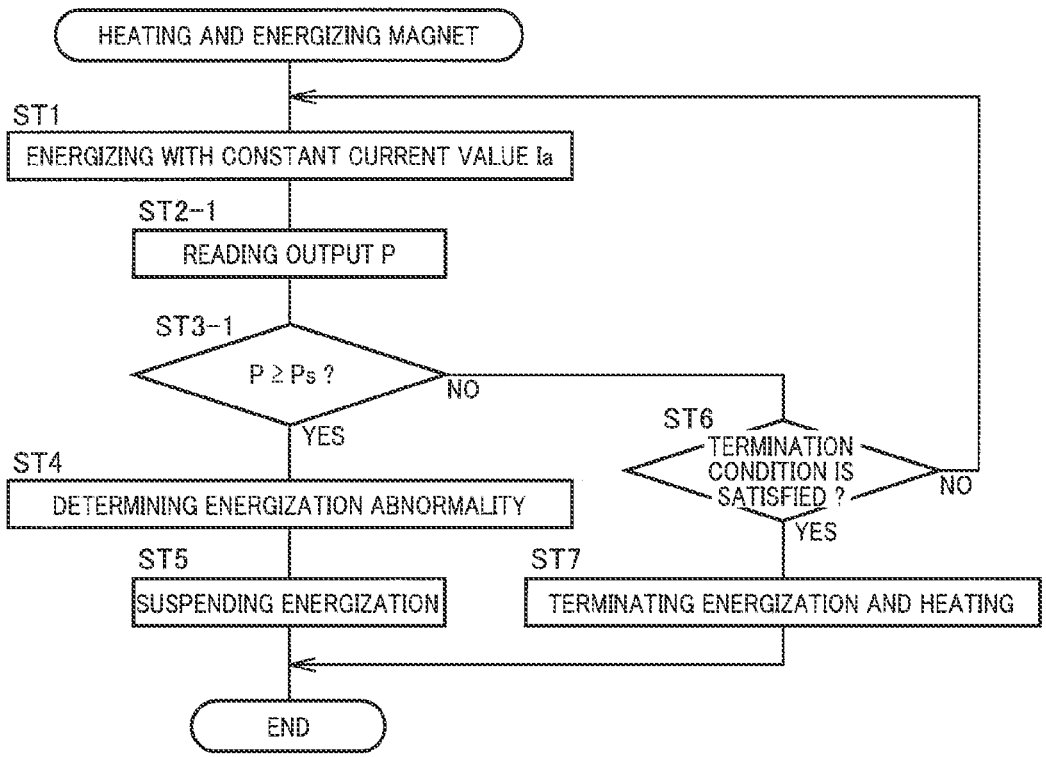
FIG. 20 is a flow chart for explaining a control routine that is to be executed at the energization heating step (corresponding to step S4 shown in FIG. 6 or step SS4 shown in FIG. 15 at which the magnet is heated by energization so as to be fixed to the rotor core), for determining occurrence of the energization abnormality depending on an output.

In the control routine shown in the flow chart of FIG. 19, the occurrence of the energization abnormality is determined based on the voltage E. However, the determination can be made based on, in place of the voltage E, an output P that corresponds to a product of the electric current and the voltage (electric current × voltage), as in a control routine shown in a flow chart of FIG. 20. The control routine of FIG. 20 is different from the control routine of FIG. 19 in that the steps ST2 and ST3 are replaced by steps ST2-1 and ST3-1 which are implemented to read the output P detected by an output meter or the like. The output P may be calculated also by detecting the voltage E and multiplying the detected voltage E by the constant electric current value Ia. At the step ST3-1, it is monitored whether the output P is at least a predetermined abnormality determination value Ps or not. When the calculated output P is not smaller than the abnormality determination value Ps (P≥Ps), it is determined at step ST4 that the energization abnormality occurs, and step ST5 is implemented to suspend the energization. When the calculated output P is smaller than the abnormality determination value Ps (P<Ps), step ST3-1 is followed by step ST6. Since the electric current value is a constant value, the abnormality determination based on the output P is practically the same as the abnormality determination based on the voltage E. That is, in the control routine of FIG. 20 in which the output P (that is obtained by multiplying the constant electric current value Ia by the votage E) is used for the abnormality determination, it is possible to obtain substantially the same effects as in the control routine of FIG. 19 in which the voltage E is used for the abnormality determination. It is noted that the abnormality determination value Ps corresponds to, for example, a product of the abnormality determination value Es and the constant electric current value Ia.

It is noted that the energization and heating can be performed by controlling the voltage E in accordance with the control routines shown in the flow charts of FIGS. 19 and 20, also in the arrangement shown in FIG. 8 in which the plurality of magnets 24 are connected in series so as to be energized and heated, in the arrangement shown in FIG. 10 in which the electrodes 56, 58 are pressed against the magnet 80 (including the divided magnets 82, 84) so as to energize and heat the magnet 80, in the arrangement shown in FIG. 12 in which the fork-shaped electrodes 86, 88 are pressed against the magnet 80 (including the divided magnets 82, 84) so as to energize and heat the magnet 80, in the arrangement shown in FIG. 13 in which the fork-shaped electrodes 98, 100 are pressed against the magnet 90 (including the divided magnets 92, 94, 96) so as to energize and heat the magnet 90, and in the arrangement shown in FIG. 17 in which the magnet 24 is energized and heated by using the alternating current. In the arrangement of FIG. 17, the energization control device 110 is provided with an electronic control device including a microcomputer, as the above-described energization control device 62, so as to cause the magnet 24 to be energized and heated in accordance with the control routines shown in the flow charts of FIGS. 19 and 20, by using the effective values of the electric current and the voltage.

While the preferred embodiments of the present invention have been described in detail by reference to the drawings, it is to be understood that the embodiments described above are given for illustrative purpose only, and that the present invention may be embodied with various modifications and improvements which may occur to those skilled in the art.

NOMENCLATURE OF ELEMENTS

- 10: rotating electric machine
- 12: rotor of rotating electric machine
- 22; 112: rotor core
- 24; 80; 90: magnet
- 36; 14: magnet receiving hole (magnet fixing portion)
- 38: fixing member
- 40: fiber member (expansion material)
- 50: manufacturing apparatus
- 52: holding device
- 54: rotating device
- 56, 58; 86, 88; 98, 100: electrode
- 60: pressing device
- 62; 110: energization control device
- 70; 72: connecting electrode
- 82, 84; 92, 94, 96: divided magnets (divided portions of magnet)
- O: axis
- M: magnet fixing position
- S1, S2; SS1, SS2: placing step
- S3, S4; SS3, SS4: fixing step
- Ia: constant electric current value
- E: voltage
- Es: abnormality determination value
- P: output
- Ps: abnormality determination value

What is claimed is:

1. A method of manufacturing a rotor that is to be provided in a rotating electric machine, the rotor including (i) a rotor core and (ii) at least one magnet fixed in at least one magnet fixing portion which is provided in the rotor core and which extends in parallel to an axis of the rotor core, the method comprising:

a placing step of placing the at least one magnet and at least one fixing member in the at least one magnet fixing portion of the rotor core such that each of the at least one fixing member is positioned between a corresponding one of the at least one magnet fixing portion and a corresponding one of the at least one magnet; and a fixing step of applying an electric current to the at least one magnet through electrodes brought in contact with opposite end portions of the at least one magnet, so as to heat the at least one fixing member by heat generated by an electrical resistance of the at least one magnet, and fixing the at least one magnet to the at least one magnet fixing portion through the heated at least one fixing member.

2. The method according to claim 1, wherein each of the at least one magnet, which is to be fixed to a corresponding one of the at least one magnet fixing portion, includes a certain number of divided portions that are divided by at least one plane, which is parallel to the axis of the rotor core when the each of the at least one magnet is fixed to the corresponding one of the at least one magnet fixing portion, wherein each of the electrodes has a fork shape, and includes the certain number of branch portions, which are to be brought into contact with end portions of the respective divided portions of a corresponding one of the at least one magnet, independently of each other, and wherein the certain number is a natural number that is two or more than two.

3. The method according to claim 1, wherein, at the fixing step, a direct current as the electric current is applied to the at least one magnet.

4. The method according to claim 1, wherein, at the fixing step, the electrodes are pressed against the at least one magnet by a predetermined constant pressing force.

5. The method according to claim 1, wherein the at least one magnet fixing portion provided in the rotor core consists of a plurality of magnet fixing portions, and the at least one magnet consists of a plurality of magnets that are to be fixed to the respective magnet fixing portions, and wherein, at the fixing step, at least two of the plurality of magnets are electrically connected in series, and the electric current is applied to the at least two of the plurality of magnets concurrently each other.

6. The method according to claim 1, wherein the at least one fixing member includes a thermosetting resin, a thermoplastic resin and/or an expansion material, and wherein, at the fixing step, the at least one magnet is fixed to the at least one magnet fixing portion, by curing of the thermosetting resin which is caused by heating of the thermosetting resin, cooling curing of the thermoplastic resin after softening of the thermoplastic resin which is caused by heating of the thermoplastic resin, or expansion of the expansion material which is caused by heating of the expansion material.

7. The method according to claim 1, wherein, at the fixing step, a voltage of the electric current applied to the at least one magnet is controlled such that the at least one magnet is energized with a constant current value, and wherein, at the fixing step, it is monitored whether the voltage or an output, which is a product of the current value and the voltage, is a predetermined abnormality determination value or higher, and application of the electric current to the at least one magnet is suspended when the voltage or the output is not smaller than the predetermined abnormality determination value.

* * * * *